United States Patent
Kurokawa et al.

(10) Patent No.: US 12,140,306 B2
(45) Date of Patent: Nov. 12, 2024

(54) OPTICAL ELEMENT AND LIGHTING DEVICE

(71) Applicant: Japan Display Inc., Tokyo (JP)

(72) Inventors: Tae Kurokawa, Tokyo (JP); Takeo Koito, Tokyo (JP); Kojiro Ikeda, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

(21) Appl. No.: 18/231,297

(22) Filed: Aug. 8, 2023

(65) Prior Publication Data

US 2023/0375159 A1    Nov. 23, 2023

Related U.S. Application Data

(63) Continuation of application No. PCT/JP2021/046385, filed on Dec. 15, 2021.

(30) Foreign Application Priority Data

Feb. 18, 2021  (JP) .................................. 2021-024716

(51) Int. Cl.
*F21V 9/40* (2018.01)
*G02F 1/1343* (2006.01)
*G02F 1/1347* (2006.01)

(52) U.S. Cl.
CPC .......... *F21V 9/40* (2018.02); *G02F 1/134309* (2013.01); *G02F 1/13439* (2013.01); *G02F 1/1347* (2013.01)

(58) Field of Classification Search
CPC .......... F21V 7/00; F21V 9/40; G02F 1/13471; G02F 1/1343; G02F 1/13; G02F 1/1347;

(Continued)

(56) References Cited

U.S. PATENT DOCUMENTS

2005/0243237 A1* 11/2005 Sasuga .................. F21V 14/003
                                                         349/57
2010/0149444 A1  6/2010 Hikmet et al.
(Continued)

FOREIGN PATENT DOCUMENTS

JP     2003-045204 A    2/2003
JP     2005-317879 A    11/2005
(Continued)

OTHER PUBLICATIONS

International Search Report issued in International Patent Application No. PCT/JP2021/046385 on Mar. 8, 2022 and English translation of same. 6 pages.

(Continued)

*Primary Examiner* — Mariam Qureshi
(74) *Attorney, Agent, or Firm* — K&L Gates LLP

(57) ABSTRACT

An optical element includes a first liquid crystal cell and a second liquid crystal cell. The first liquid crystal cell and the second liquid crystal cell are stacked. Each of the first liquid crystal cell and the second liquid crystal cell includes a first substrate on which a first transparent electrode and a second transparent electrode are alternately and repeatedly arranged in a first direction, a second substrate on which a third transparent electrode and a fourth transparent electrode are alternately and repeatedly arranged in a second direction intersecting the first direction, and a liquid crystal layer between the first substrate and the second substrate. The second substrate of the first liquid crystal cell and the first substrate of the second liquid crystal cell are adjacent to each other.

15 Claims, 21 Drawing Sheets

(58) Field of Classification Search
CPC .. G02F 1/13439; G02F 1/134309; G02B 3/14
See application file for complete search history.

(56) References Cited

U.S. PATENT DOCUMENTS

2018/0196318 A1* 7/2018 Presniakov ....... G02F 1/134363
2018/0314075 A1* 11/2018 Zhang ............... G02F 1/134309

FOREIGN PATENT DOCUMENTS

| | | |
|---|---|---|
| JP | 2010-525388 A | 7/2010 |
| JP | 2010-230887 A | 10/2010 |
| JP | 2014-160277 A | 9/2014 |

OTHER PUBLICATIONS

Written Opinion issued in International Patent Application No. PCT/JP2021/046385 on Mar. 8, 2022. 4 pages.
English translation of Office Action issued in related Japanese Patent Application No. 2023-500578 on Apr. 2, 2024. 4 pages.

* cited by examiner

OPTICAL ELEMENT AND LIGHTING DEVICE

CROSS-REFERENCE TO RELATED APPLICATIONS

This application is a Continuation of International Patent Application No. PCT/JP2021/046385, filed on Dec. 15, 2021, which claims the benefit of priority to Japanese Patent Application No. 2021-024716, filed on Feb. 18, 2021, the entire contents of which are incorporated herein by reference.

FIELD

An embodiment of the present invention relates to an optical element capable of controlling light distribution. Further, an embodiment of the present invention relates to a lighting device including an optical element capable of controlling light distribution.

BACKGROUND

An optical element which is a so-called liquid crystal lens has been conventionally known in which a change in the refractive index of a liquid crystal is utilized by adjusting a voltage applied to the liquid crystal. Further, a lighting device using a light source and a liquid crystal lens has been developed (for example, see Japanese laid-open patent publication No. 2005-317879, 2010-230887, or 2014-160277).

SUMMARY

An optical element according to an embodiment of the present invention includes a first liquid crystal cell and a second liquid crystal cell. The first liquid crystal cell and the second liquid crystal cell are stacked. Each of the first liquid crystal cell and the second liquid crystal cell includes a first substrate on which a first transparent electrode and a second transparent electrode are alternately and repeatedly arranged in a first direction, a second substrate on which third a transparent electrode and a fourth transparent electrode are alternately and repeatedly arranged in a second direction intersecting the first direction, and a liquid crystal layer between the first substrate and the second substrate. The second substrate of the first liquid crystal cell and the first substrate of the second liquid crystal cell are adjacent to each other.

Further, a lighting device according to an embodiment of the present invention includes a light source and an optical element including a first liquid crystal cell and a second liquid crystal cell. The first liquid crystal cell and the second liquid crystal cell are stacked. Each of the first liquid crystal cell and the second liquid crystal cell includes a first substrate on which a first transparent electrode and a second transparent electrode are alternately and repeatedly arranged in a first direction, a second substrate on which a third transparent electrode and a fourth transparent electrode are alternately and repeatedly arranged in a second direction intersecting the first direction, and a liquid crystal layer between the first substrate and the second substrate. The second substrate of the first liquid crystal cell and the first substrate of the second liquid crystal cell are adjacent to each other.

DESCRIPTION OF EMBODIMENTS

Figure 1:
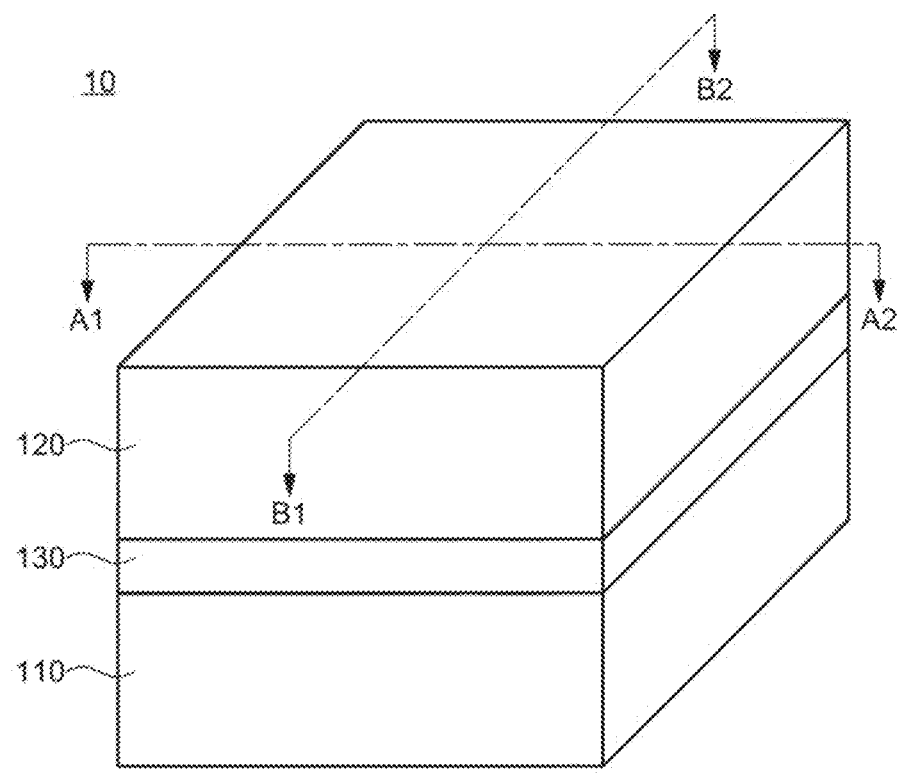
FIG. 1 is a schematic perspective view of an optical element according to an embodiment of the present invention.
Figure 1:
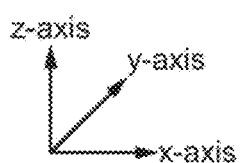

However, in the lighting device described in Japanese laid-open patent publication No. 2005-317879 or 2010-230887, the liquid crystal lens is used to merely concentrate light by controlling the light spread distribution of light, that is, a light distribution angle. In other words, in the lighting device described in Japanese laid-open patent publication No. 2005-317879 or 2010-230887, the light distribution pattern is limited to a concentric circular shape. Further, in the beam shaping device described in Japanese laid-open patent publication No. 2014-160277, a light distribution pattern is changed by changing a pattern of electrodes applied to the liquid crystal, so that a crystal cell with a complex configuration is required and mass productivity is poor.

In view of the above problem, one object of an embodiment of the present invention is to provide an optical element capable of controlling a light distribution or light distribution patterns. Another object of an embodiment of the present invention is to provide a lighting device capable of controlling a light distribution or light distribution patterns.

Hereinafter, each of the embodiments of the present invention is described with reference to the drawings. However, the present invention can be implemented in various modes without departing from the gist of the invention and should not be interpreted as being limited to the description of the embodiments exemplified below.

Although the drawings may be schematically represented in terms of width, thickness, shape, and the like of each part as compared with their actual mode in order to make explanation clearer, they are only an example and an interpretation of the present invention is not limited. In addition, in the drawings, the same reference numerals are provided to the same elements as those described previously with reference to preceding figures and repeated explanations may be omitted accordingly.

In the case when a single film is processed to form a plurality of structural bodies, each structural body may have different functions and roles, and the bases formed beneath each structural body may also be different. However, the plurality of structural bodies is derived from films formed in the same layer by the same process and have the same material. Therefore, the plurality of these films is defined as existing in the same layer.

When expressing a mode in which another structure is arranged over a certain structure, in the case where it is simply described as "over", unless otherwise noted, a case where another structure is arranged directly over a certain structure as if in contact with that structure, and a case where another structure is arranged via another structure over a certain structure, are both included.

First Embodiment

An optical element 10 according to an embodiment of the present invention is described with reference to FIGS. 1 to 11.

[1. Configuration of Optical Element]

FIG. 1 is a schematic perspective view of an optical element 10 according to an embodiment of the present invention. As shown in FIG. 1, the optical element 10 includes a first liquid crystal cell 110, a second liquid crystal cell 120, and an optical elastic resin layer 130. The optical elastic resin layer 130 is provided between the first liquid crystal cell 110 and the second liquid crystal cell 120. That is, the first liquid crystal cell 110 and the second liquid crystal cell 120 are stacked in the z-axis direction with the optical elastic resin layer 130 interposed therebetween.

The optical elastic resin layer 130 can adhere and fix the first liquid crystal cell 110 and the second liquid crystal cell 120. For example, an adhesive containing an optical elastic resin such as a translucent acrylic resin can be used for the optical elastic resin layer 130.

Figure 2A:
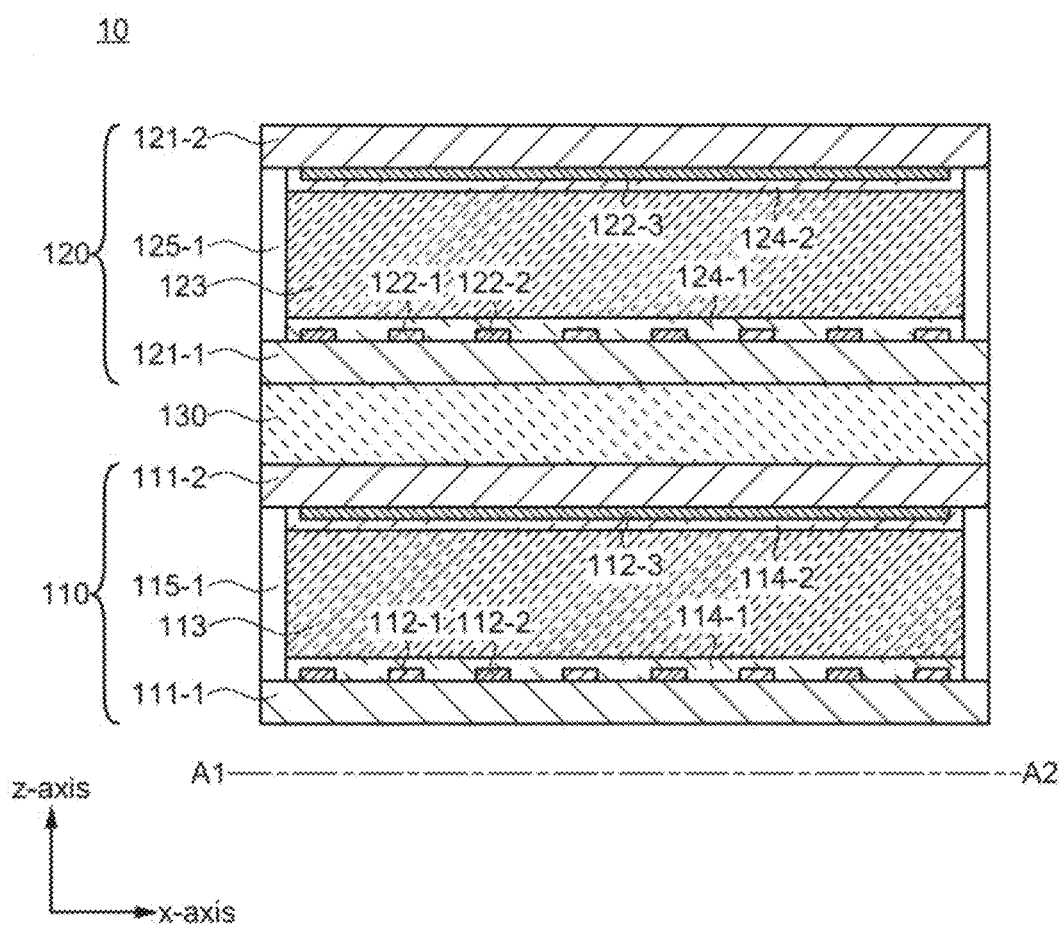
FIG. 2A is a schematic cross-sectional view of an optical element according to an embodiment of the present invention.
Figure 2B:
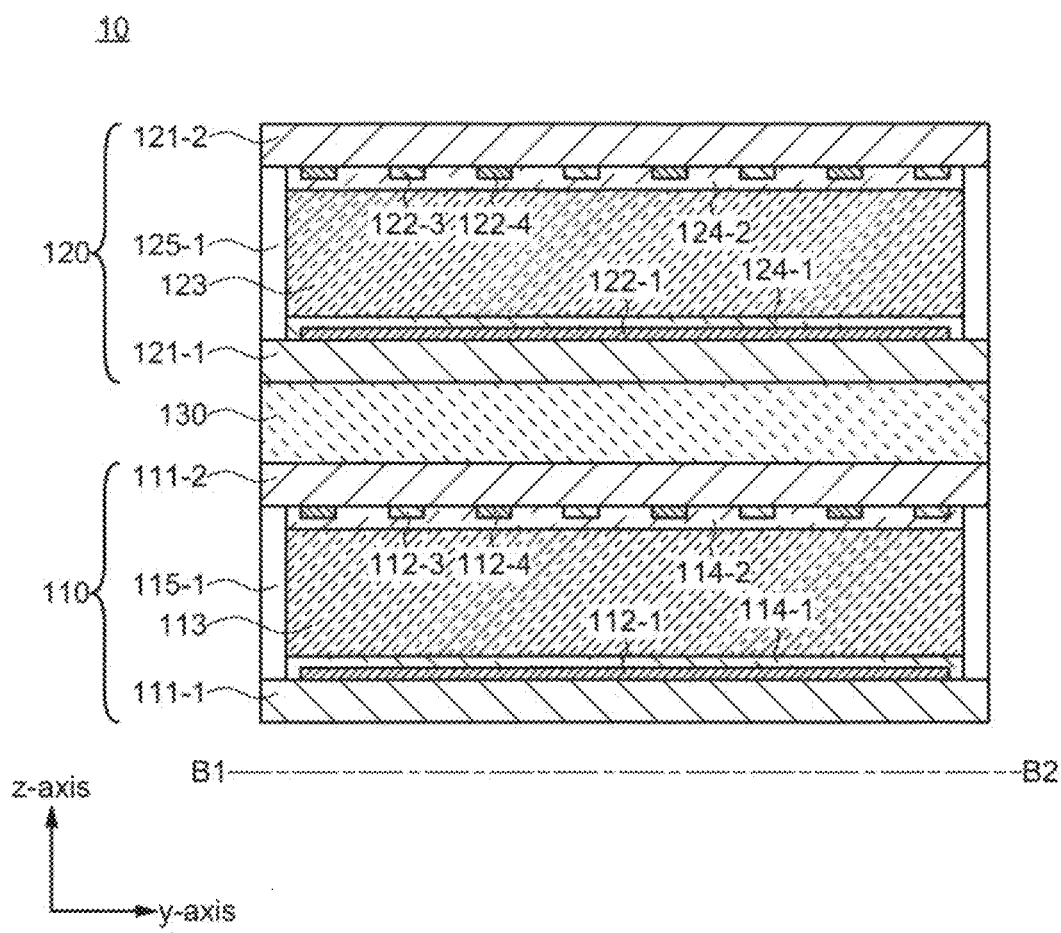
FIG. 2B is a schematic cross-sectional view of an optical element according to an embodiment of the present invention.

FIGS. 2A and 2B are schematic cross-sectional views of the optical element 10 according to an embodiment of the invention. Specifically, FIG. 2A is a schematic cross-sectional view in a z-x plane cut along a line A1-A2 shown in FIG. 1, and FIG. 2B is a schematic cross-sectional view in a y-z plane cut along a line B1-B2 shown in FIG. 1. In addition, hereinafter, the x-axis direction and the y-axis direction may be described as the first direction and the second direction, respectively.

The first liquid crystal cell 110 includes a first substrate 111-1, a second substrate 111-2, a first transparent electrode 112-1, a second transparent electrode 112-2, a third transparent electrode 112-3, a fourth transparent electrode 112-4, a liquid crystal layer 113, a first alignment film 114-1, a second alignment film 114-2, and a sealing member 115. The second liquid crystal cell 120 includes a first substrate 121-1, a second substrate 121-2, a first transparent electrode 122-1, a second transparent electrode 122-2, a third transparent electrode 122-3, a fourth transparent electrode 122-4, a liquid crystal layer 123, a first alignment film 124-1, a second alignment film 124-2, and a sealing member 125.

Although the optical element 10 has two liquid crystal cells, the two liquid crystal cells preferably have the same configuration. Therefore, only a configuration of the first liquid crystal cell 110 is described below, and the description of the configuration of the second liquid crystal cell 120 may be omitted for convenience.

The first transparent electrode 112-1 and the second transparent electrode 112-2 are provided on the first substrate 111-1. Further, the first alignment film 114-1 that covers the first transparent electrode 112-1, the second transparent electrode 112-2, and a surface of the first substrate 111-1 is provided.

The third transparent electrode 112-3 and the fourth transparent electrode 112-4 are provided on the second substrate 111-2. Further, the second alignment film 114-2 that covers the third transparent electrode 112-3, the fourth transparent electrode 112-4, and a surface of the second substrate 111-2 is provided.

The first substrate 111-1 and the second substrate 111-2 are arranged so that the first transparent electrode 112-1 and the second transparent electrode 112-2 on the first substrate 111-1 faces the third transparent electrode 112-3 and the fourth transparent electrode 112-4 on the second substrate 111-2.

Further, the sealing member 115 is arranged around the periphery of each of the first substrate 111-1 and the second substrate 111-2. That is, the first substrate 111-1 and the second substrate 111-2 are bonded together with the sealing member 115 interposed therebetween. Furthermore, a liquid crystal is enclosed in a space surrounded by the first substrate 111-1 (more specifically, the first alignment film 114-1), the second substrate 111-2 (more specifically, the second alignment film 114-2), and the sealing material 115A, and the liquid crystal layer 113 is formed.

For example, a transparent rigid substrate such as a glass substrate, a quartz substrate, or a sapphire substrate is used as the first substrate 111-1 and the second substrate 111-2. Further, a configuration in which a flexible substrate having translucency such as a polyimide resin substrate, an acrylic resin substrate, a siloxane resin substrate, or a fluorine resin substrate is used as the first substrate 111-1 and the second substrate 111-2, for example, can also be adopted.

Each of the first transparent electrode 112-1, the second transparent electrode 112-2, the third transparent electrode 112-3, and the fourth transparent electrode 112-4 function as electrodes for forming an electric field in the liquid crystal layer 113. For example, a transparent conductive material such as indium tin oxide (ITO) or indium zinc oxide (IZO) is used for each of the first transparent electrode 112-1, the second transparent electrode 112-2, the third transparent electrode 112-3, and the fourth transparent electrode 112-4.

The liquid crystal layer 113 can refract transmitted light or change the polarization state of transmitted light according to the alignment state of the liquid crystal molecules. For example, nematic liquid crystal can be used as the liquid crystal of the liquid crystal layer 113. Although a positive liquid crystal is adopted in the embodiment, it is also possible to adopt a negative liquid crystal by changing the initial alignment direction of the liquid crystal molecules. Further, the liquid crystal preferably contains a chiral agent that imparts twist to the liquid crystal molecules.

Each of the first alignment film 114-1 and the second alignment film 114-2 aligns the liquid crystal molecules in the liquid crystal layer 113 in a predetermined direction. For example, a polyimide resin or the like can be used for each of the first alignment film 114-1 and the second alignment film 114-2. In addition, each of the first alignment film 114-1 and the second alignment film 114-2 may be imparted with alignment properties by an alignment treatment such as a rubbing method or a photo-alignment method. The rubbing method is a method of rubbing the surface of the alignment film in one direction. The photo-alignment method is a method of irradiating an alignment film with linearly polarized ultraviolet rays.

The sealing member 115 adheres and fixes the first substrate 111-1 and the second substrate 111-2. For example, an epoxy resin adhesive, an acrylic resin adhesive, or the like can be used for the sealing member 115. The adhesive may be of an ultraviolet curable type or a heat curable type.

Although the details are described later, the optical element 10 can control the light distribution of unpolarized light and forms the light distribution patterns by including two liquid crystal cells (the first liquid crystal cell 110 and the second liquid crystal cell 120). Therefore, it is not necessary to provide a pair of polarizing plates on the outer surface of each substrate, which are provided on the front and rear surfaces of a liquid crystal display element, for example.

[2. Arrangement of Transparent Electrodes]

An arrangement of each of the first transparent electrode 112-1, the second transparent electrode 112-2, the third transparent electrode 112-3, and the fourth transparent electrode 112-4 is described in detail with reference to FIGS. 3A and 3B.

Figure 3A:
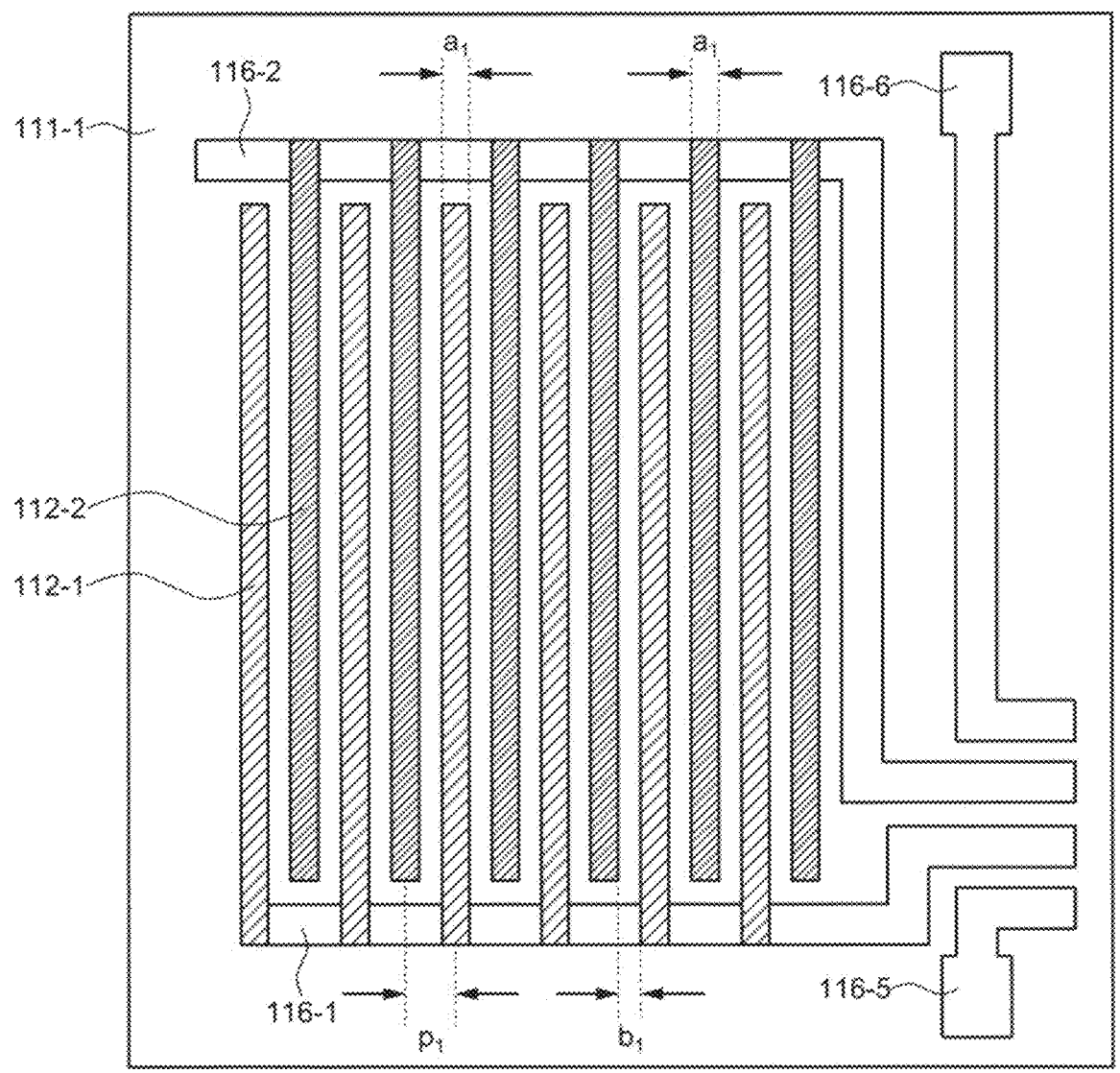
FIG. 3A is a schematic plan view showing arrangements of a first transparent electrode and a second transparent electrode on a first substrate in an optical element according to an embodiment of the present invention.

FIG. 3A is a schematic plan view showing arrangements of the first transparent electrode 112-1 and the second transparent electrode 112-2 on the first substrate 111-1 in the optical element 10 according to an embodiment of the present invention. Further, FIG. 3B is a schematic plan view showing arrangements of the third transparent electrode 112-3 and the fourth transparent electrode 112-4 on the second substrate 111-2 in the optical element 10 according to an embodiment of the present invention. In addition, each of FIGS. 3A and 3B show the arrangement of each transparent electrode viewed from the first liquid crystal layer 115-1 side.

As shown in FIG. 3A, each of the first transparent electrode 112-1 and the second transparent electrode 112-2 has a first width $a_1$ in the x-axis direction and extends in the y-axis direction. Further, the first transparent electrode 112-1 and the second transparent electrode 112-2 are alternately and repeatedly arranged with a first inter-electrode distance $b_1$ in the x-axis direction. That is, the first transparent electrode 112-1 and the second transparent electrode 112-2 have a first pitch $p_1$ and the first pitch $p_1$ satisfies $p_1=a_1+b_1$. Further, the first transparent electrode 112-1 and the second transparent electrode 112-2 are electrically connected to a first wiring 116-1 and a second wiring 116-2 formed on the first substrate 111-1, respectively. The first wiring 116-1 may be formed under the first transparent electrode 112-1 or may be formed over the first transparent electrode 112-1. In this case, the first wiring 116-1 may be made of metal. Further, the first wiring 116-1 may be formed in the same layer as the first transparent electrode 112-1. The same configuration of the first wiring 116-1 is applied to the second wiring 116-2.

The alignment treatment is performed on the first alignment film 114-1 along the x-axis direction. In this case, the long axes of the liquid crystal molecules closer to the first substrate 111-1, which constitute part of the liquid crystal layer 113, are aligned along the x-axis direction in the absence of an electric field. That is, the alignment direction (x-axis direction) of the first alignment film 114-1 and the extending direction (y-axis direction) of the first transparent electrode 112-1 or the second transparent electrode 112-2 are orthogonal to each other. In addition, the alignment treatment includes rubbing or photo-alignment. Further, the alignment directions of the first alignment film 114-1 and the second alignment film 114-2 may be even orthogonal to each other, and each of the alignment directions may intersect at an angle other than perpendicular to the extending direction of the transparent electrode provided with the first alignment film 114-1 or the second alignment film 114-2.

Figure 3B:
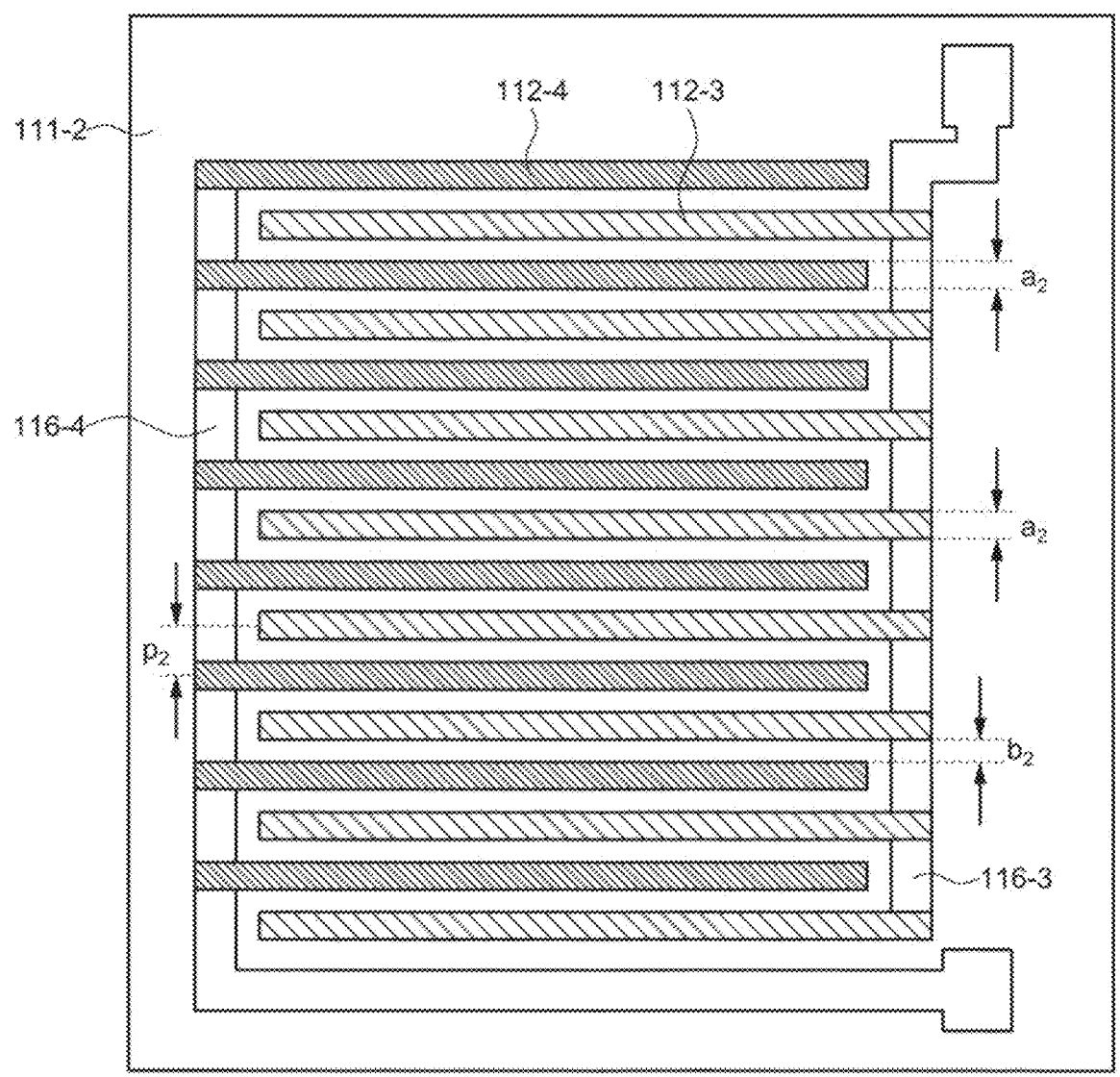
FIG. 3B is a schematic plan view showing arrangements of a third transparent electrode and a fourth transparent electrode on a second substrate in an optical element according to an embodiment of the present invention.

As shown in FIG. 3B, each of the third transparent electrode 112-3 and the fourth transparent electrode 112-4 has a second width $a_2$ in the y-axis direction and extends in the x-axis direction. Further, the third transparent electrode 112-3 and the fourth transparent electrode 112-4 are alternately and repeatedly arranged with a second inter-electrode distance $b_2$ in the y-axis direction. That is, the third transparent electrode 112-3 and the fourth transparent electrode 112-4 have a second pitch $p_2$ and the second pitch satisfies $p_2=a_2+b_2$. Further, the third transparent electrode 112-3 and the fourth transparent electrode 112-4 are electrically connected to a third wiring 116-3 and a fourth wiring 116-4 formed on the second substrate 111-2, respectively. The third wiring 116-3 and the fourth wiring 116-4 may be formed under the third transparent electrode 112-3 and the fourth transparent electrode 112-4, or may be formed over the third transparent electrode 112-3 and the fourth transparent electrode 112-4. In this case, the third wiring 116-3 and the fourth wiring 116-4 may be made of metal. Further, the third wiring 116-3 and the fourth wiring 116-4 may be formed in the same layer as the third transparent electrode 112-3 and the fourth transparent electrode 112-4.

The alignment treatment is performed on the second alignment film 114-2 along the y-axis direction. In this case, the long axes of the liquid crystal molecules closer to the second substrate 111-2, which constitute part of the liquid crystal layer 113, are aligned along the y-axis direction in the absence of an electric field. That is, the alignment direction (y-axis direction) of the second alignment film 114-2 and the extending direction (x-axis direction) of the third transparent electrode 112-3 or the fourth transparent electrode 112-4 are orthogonal to each other.

In addition, it can also be described that a plurality of first transparent electrodes 112-1 and a plurality of second transparent electrodes are formed on the first substrate 111-1 in a comb-like pattern with the first pitch $p_1$. Similarly, it can also be described that a plurality of third transparent electrodes 112-3 and a plurality of fourth transparent electrodes 112-4 are formed on the second substrate 111-2 in a comb pattern with the second pitch $p_2$.

In the first liquid crystal cell 110, the first transparent electrode 112-1 and the second transparent electrode 112-2 face the third transparent electrode 112-3 and the fourth transparent electrode 112-4 through the liquid crystal layer 113. Here, the direction (y-axis direction) in which the first transparent electrode 112-1 and the second transparent electrode 112-2 extend are orthogonal to the direction (x-axis direction) in which the third transparent electrode 112-3 and the fourth transparent electrode 112-3 extend. In other words, the comb-shaped electrode pattern formed on the first substrate 111-1 and the comb-shaped electrode pattern formed on the second substrate 111-2 are orthogonal to each other in a plan view. Further, a fifth wiring 116-5 and a sixth wiring 116-6 are formed on the first substrate 111-1. When the first substrate 111-1 and second substrate 111-2 are bonded to each other, the third wiring 116-3 and the fourth wiring 116-4 are electrically connected to the fifth wiring 116-5 and the sixth wiring 116-6 on the first substrate 111-1, respectively. The electrical connection between the third wiring 116-3 and the fifth wiring 116-5 and the electrical connection between the fourth wiring 116-4 and the sixth wiring 116-6 can be formed using, for example, silver paste or conductive particles (including metal-coated particles) and the like.

In the embodiment, although the first direction in which the first transparent electrode 112-1 and the second transparent electrode 112-2 are alternately arranged is orthogonal to the second direction in which the third transparent electrode 112-3 and the fourth transparent electrode 112-3 are alternately arranged, the first and second directions may intersect and the intersection angle may be other than 90 degrees. Further, the intersection of the first and the second transparent electrodes 112-1, 112-2 on the first substrate 111-1 and the third and the fourth transparent electrodes 112-3, 112-4 on the second substrate 111-2 allows the alignments of the liquid crystal molecules in the liquid crystal layer 113 to be controlled by controlling potentials applied to the respective electrodes, which is described later. Thus, the light distribution or the light distribution patterns can be controlled.

Photo spacers are formed on the first substrate 111-1 or the second substrate 111-2 to maintain the gap therebetween (not shown in the figures).

For example, a metal material such as aluminum or molybdenum or a transparent conductive material such as indium tin oxide (ITO) or indium zinc oxide (IZO) can be used for each of the first wiring 116-1, the second wiring 116-2, the third wiring 116-3, the fourth wiring 116-4, the fifth wiring 116-5, and the sixth wiring 116-6. In addition, each of the first wiring 116-1, second wiring 116-2, fifth wiring 116-5, and sixth wiring 116-6 may be provided with a terminal for connecting to an external device.

The first wiring 116-1, the second wiring 116-2, the fifth wiring 116-5 (or the third wiring 116-3), and the sixth wiring 116-6 (or the fourth wiring 116-4) are electrically isolated from each other. Therefore, in the first liquid crystal cell 110, the liquid crystal molecules in the liquid crystal layer 113 can be controlled by applying a different potential to each of the first transparent electrode 112-1, the second transparent electrode 112-2, the third transparent electrode 112-3, and the fourth transparent electrode 112-4.

[3. Control of Alignment of Liquid Crystal]

The alignment of the liquid crystal in the liquid crystal layer 113 is described in detail with reference to FIGS. 4A and 4B.

Figure 4A:
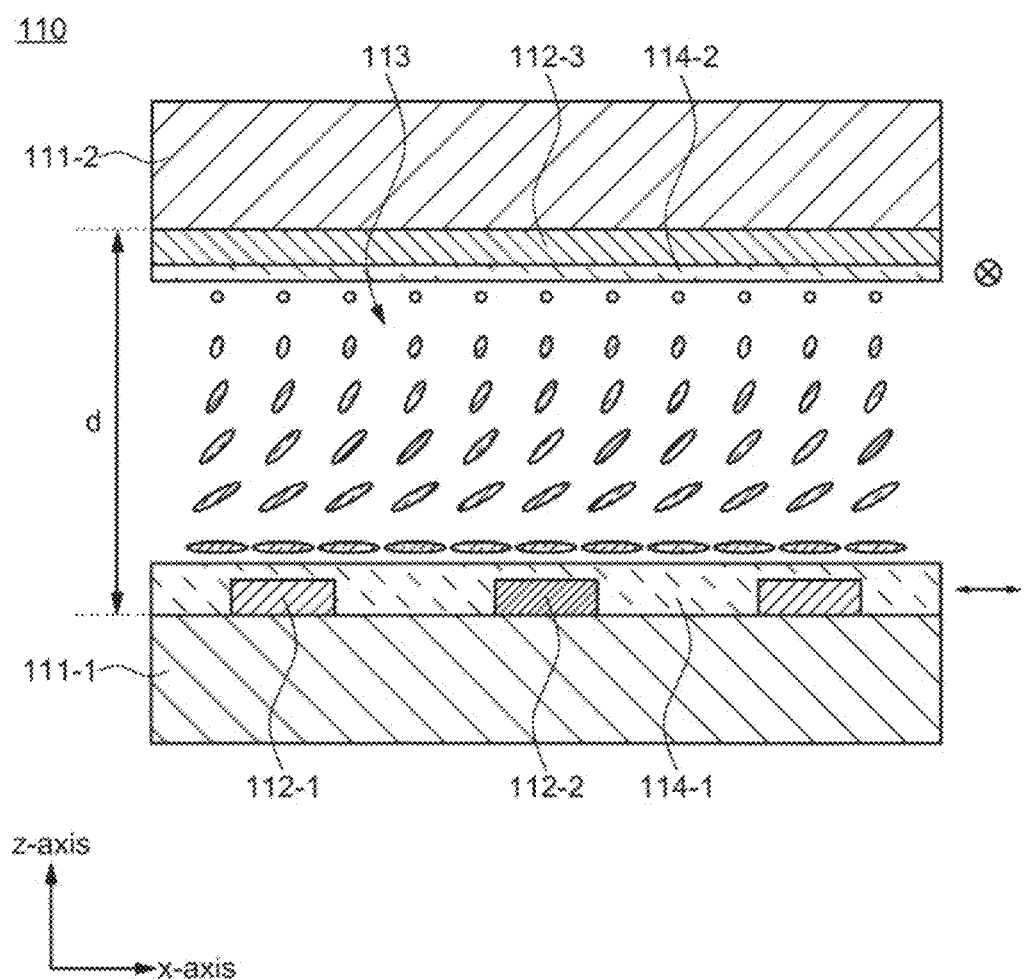
FIG. 4A is a schematic cross-sectional view showing an alignment of liquid crystal molecules in a liquid crystal layer in an optical element according to an embodiment of the present invention.
Figure 4B:
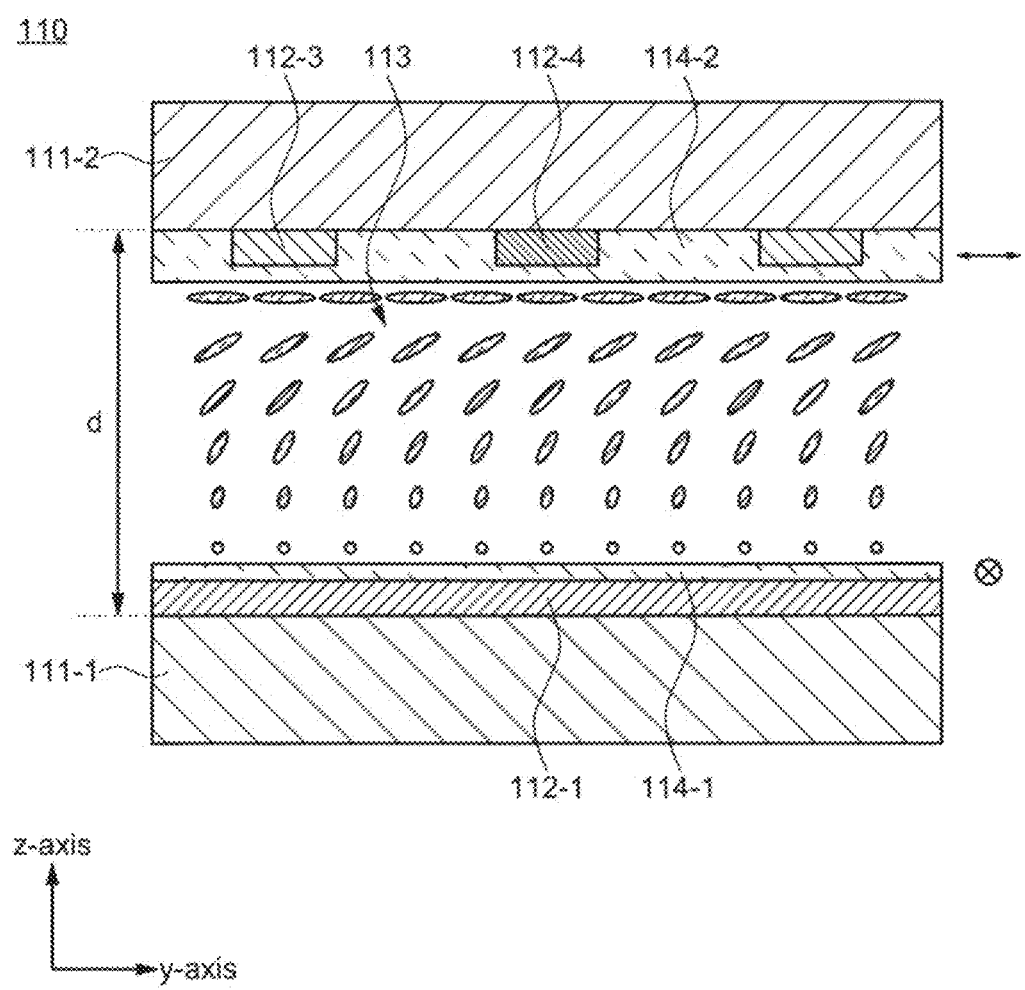
FIG. 4B is a schematic cross-sectional view showing an alignment of liquid crystal molecules in a liquid crystal layer in an optical element according to an embodiment of the present invention.

FIGS. 4A and 4B are schematic cross-sectional views showing the alignment of liquid crystal molecules in the liquid crystal layer 113 in the optical element 10 according to an embodiment of the present invention. FIGS. 4A and 4B correspond to portions of the cross-sectional view of the first liquid crystal cell 110 shown in FIGS. 2A and 2B, respectively.

As shown in FIGS. 4A and 4B, the first substrate 111-1 and the second substrate 111-2 are bonded to each other with an inter-substrate distance d. The alignment treatments in the x-axis direction and y-axis direction are performed on the first alignment film 114-1 of the first substrate 111-1 and the second alignment film 114-2 of the second substrate 111-2, respectively. Therefore, in the liquid crystal layer 113, the long axes of the liquid crystal molecules closer to the first substrate 111-1 are aligned along the x-axis direction when no potential is applied to the transparent electrodes (In FIGS. 4A and 4B, for convenience, the alignment direction of the liquid crystal molecules aligned in the horizontal direction of the paper is indicated by an arrow symbol.). That is, the alignment direction of the liquid crystal molecules closer to the first substrate 111-1 is orthogonal to the extending direction of the first transparent electrode 112-1 and the second transparent electrode 112-2. Further, the liquid crystal molecules closer to the second substrate 111-2 side have the long axes aligned along the y-axis direction when no potential is applied to the transparent electrodes (In FIGS. 4A and 4B, for convenience, the alignment direction of the liquid crystal molecules aligned in the perpendicular direction of the paper is indicated by using a symbol with a cross in a circle.). That is, the alignment direction of the liquid crystal molecules closer to the second substrate 111-2 is orthogonal to the extending direction of the third transparent electrode 112-3 and the fourth transparent electrode 112-4. Therefore, the liquid crystal molecules in the liquid crystal layer 113 are aligned in a state twisted by 90 degrees from the first substrate 111-1 to the second substrate 111-2 in the z-axis direction. More specifically, in FIG. 4A, the liquid crystal molecules on the side of the first substrate 111-1 are aligned with the long axes in the x-axis direction (horizontal direction on the paper surface) along the alignment direction of the first alignment film 114-1. Further, the liquid crystal molecules on the side of the second substrate 111-2 are aligned with the long axes in the y-axis direction (perpendicular direction on the paper surface) along the alignment direction of the second alignment film 114-2. Furthermore, the liquid crystal molecules between the first substrate 111-1 and the second substrate 111-2 gradually rotate their own directions of the long axes from the x-axis direction to the y-axis direction as they are close to the second substrate 111-2 from the first substrate 111-1.

Next, the alignment of the liquid crystal in the liquid crystal layer 113 when potentials are applied is described in detail with reference to FIGS. 5A to 5C.

Figure 5A:
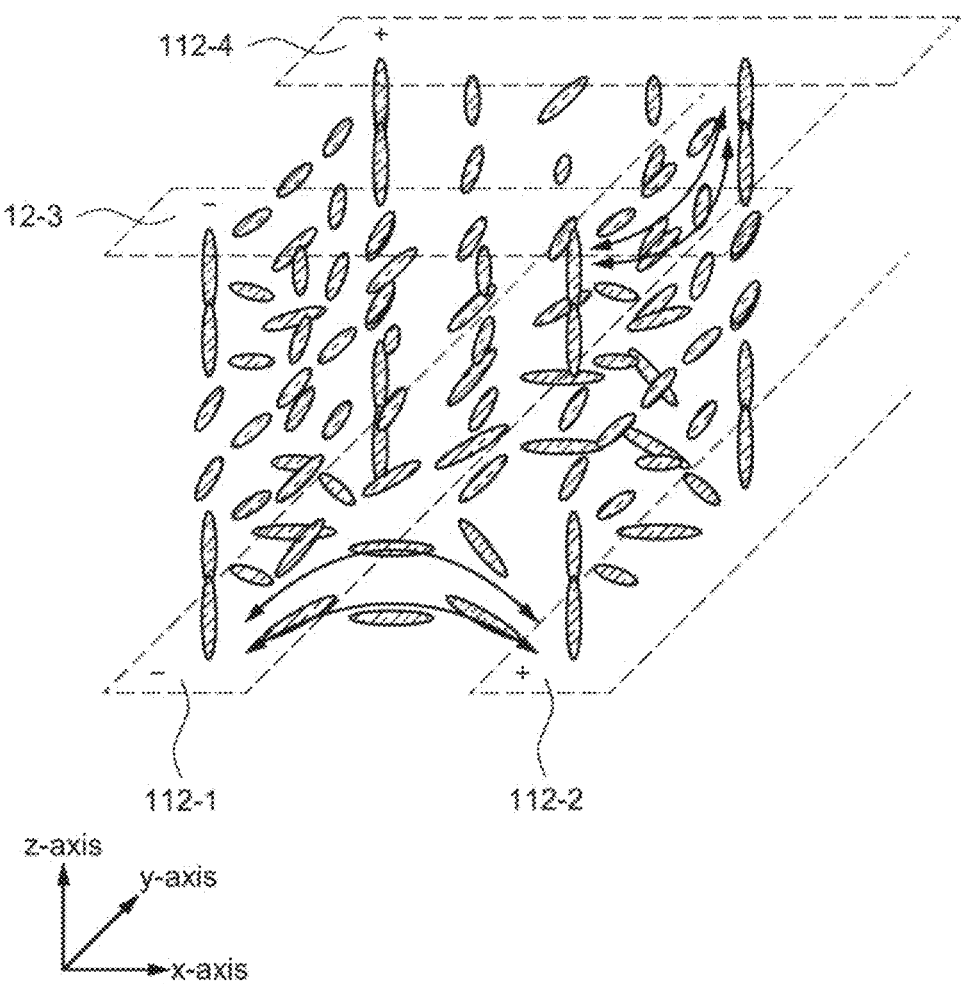
FIG. 5A is a schematic perspective view showing an alignment of liquid crystal molecules in a liquid crystal layer when potentials are applied in an optical element according to an embodiment of the present invention.

FIG. 5A is a schematic perspective view showing the alignments of the liquid crystal molecules in the liquid crystal layer 113 when potentials are applied in the optical element 10 according to an embodiment of the present invention. FIGS. 5B and 5C are schematic cross-sectional views showing the alignments of liquid crystal molecules in the liquid crystal layer 113 when potentials are applied in the optical element 10 according to an embodiment of the present invention.

In FIG. 5A, the first alignment film 114-1 and the second alignment film 114-2 are omitted for convenience. Further, in FIGS. 5B and 5C, the alignment directions of the first alignment film 114-1 and the second alignment film 114-2 are indicated by an arrow or a symbol of a cross in a circle, similar to FIGS. 4A and 4B.

Figure 5B:
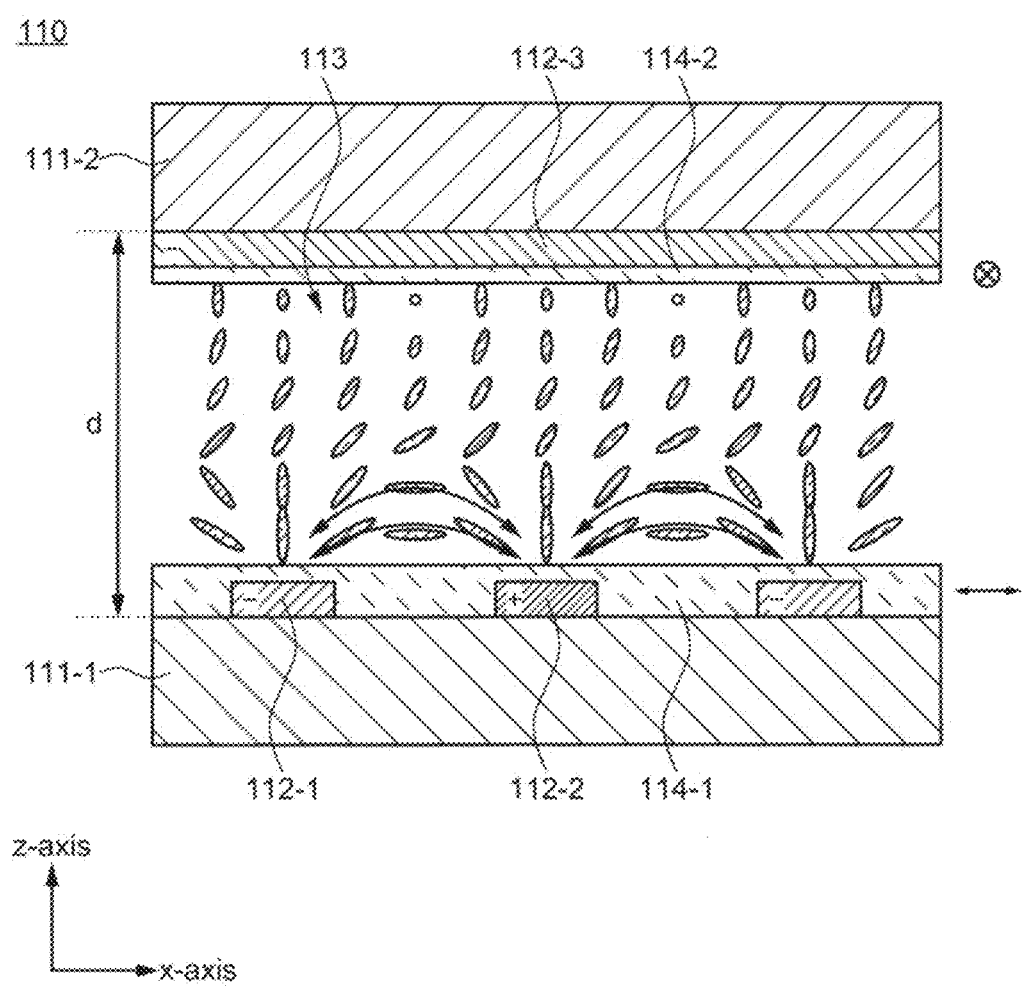
FIG. 5B is a schematic cross-sectional view showing an alignment of liquid crystal molecules in a liquid crystal layer when potentials are applied in an optical element according to an embodiment of the present invention.
Figure 5C:
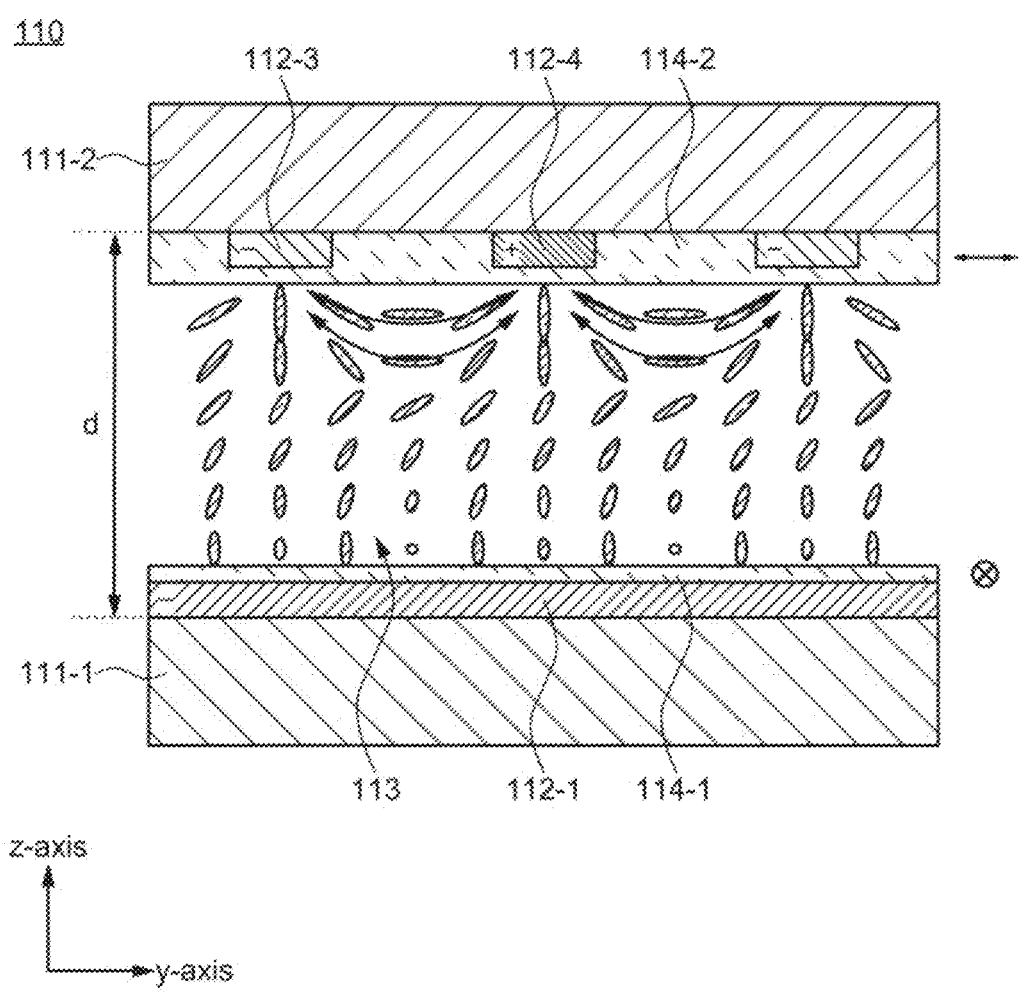
FIG. 5C is a schematic cross-sectional view showing an alignment of liquid crystal molecules in a liquid crystal layer when potentials are applied in an optical element according to an embodiment of the present invention.

In FIGS. 5A to 5C, a low potential is applied to the first transparent electrode 112-1 and the third transparent electrode 112-3, and a high potential is applied to the second transparent electrode 112-2 and the fourth transparent electrode 112-4 (In FIGS. 5A to 5C, for convenience, the low potential and the high potential are illustrated using symbols "−" and "+", respectively.). That is, potential differences are generated between the first transparent electrode 112-1 and the second transparent electrode 112-2 and between the third transparent electrode 112-3 and the fourth transparent electrode 112-4. In this case, the liquid crystal molecules on the side of the first substrate 111-1 are aligned according to the electric field (potential distribution) generated between the first transparent electrode 112-1 and the second transparent electrode 112-2. That is, the long axes of the liquid crystal molecules closer to the first substrate 111-1 are aligned along the direction from the first transparent electrode 112-1 to the second transparent electrode 112-2. Similarly, the liquid crystal molecules closer to the second substrate 111-2 are aligned along the direction from the third transparent electrode 112-3 to the fourth transparent electrode 112-4. In addition, hereinafter, an electric field generated between adjacent transparent electrodes on the same substrate may be referred to as a lateral electric field.

Further, the alignments of the liquid crystal molecules are described in detail. Although the liquid crystal molecules on the side of the first substrate 111-1 are aligned in the x-axis direction in the absence of an electric field, the alignments of the liquid crystal molecules become the same as the direction of the lateral electric field between the first transparent electrode 112-1 and the second transparent electrode 112-2. Therefore, the alignments of the liquid crystal molecules located substantially in the center between the first transparent electrode 112-1 and the second transparent electrode 112-2 in a plan view hardly change even by the lateral electric field. Further, the liquid crystal molecules closer to the first transparent electrode 112-1 or the second transparent electrode 112-2 than the center are aligned with a tilt in the z-axis direction corresponding to the lateral electric field. Therefore, as shown in FIG. 5B, due to the influence of the lateral electric field between the first transparent electrode 112-1 and the second transparent electrode 112-2, the liquid crystal molecules existing each of the adjacent transparent electrodes closer to the first substrate 111-1 are as a whole aligned in a convex arc shape from the first transparent electrode 112-1 to the second transparent electrode 112-2, as seen from the first substrate 111-1. Similarly, although the alignments of the liquid crystal molecules on the side of the second substrate 111-2 are aligned in the y-axis direction in the absence of an electric field, the alignments of the liquid crystal molecules become the same as the direction of the lateral electric field between the third transparent electrode 112-3 and the fourth transparent electrode 112-4. Therefore, the alignments of the liquid crystal molecules located substantially in the center between the third transparent electrode 112-3 and the fourth transparent electrode 112-4 in a plan view hardly changes even by the lateral electric field. Further, the liquid crystal molecules closer to the third transparent electrode 112-3 or the fourth transparent electrode 112-4 than the center are aligned with a tilt in the z-axis direction. Therefore, as shown in FIG. 5C, due to the influence of the lateral electric field between the third transparent electrode 112-3 and the fourth transparent electrode 112-4, the liquid crystal molecules existing each of the adjacent transparent electrodes closer to the second substrate 111-2 are as a whole aligned in a convex arc shape from the third transparent electrode 112-3 to the fourth transparent electrode 112-4, as seen from the second substrate 111-2. Accordingly, light incident on the liquid crystal layer 113 is diffused according to the refractive index distribution of the liquid crystal molecules aligned in a convex arc shape on the side of the first substrate 111-1 or the second substrate 111-2.

Since the first substrate 111-1 and the second substrate 111-2 are sufficiently far apart by the inter-substrate distance d, the lateral electric field between the first transparent electrode 112-1 and the second transparent electrode 112-2 of the first substrate 111-1 does not affect the alignments of the liquid crystal molecules on the side of the second substrate 111-2, or is negligibly small. Similarly, the lateral electric field between the third transparent electrode 112-3 and the fourth transparent electrode 112-4 of the second substrate 111-2 does not affect the alignments of the liquid crystal molecules on the side of the first substrate 111-1, or is negligibly small.

In the specification, the liquid crystal layer 113 (or the liquid crystal molecules) on the side of the first substrate 111-1 refers to the liquid crystal layer (or the liquid crystal molecules) within d/2 from the surface of the first substrate 111-1. Similarly, the liquid crystal layer 113 (or the liquid crystal molecules) on the side of the second substrate 111-2 refers to the liquid crystal layer (or the liquid crystal molecules) within d/2 from the surface of the second substrate 111-2.

In the first liquid crystal cell 110, the alignments of the liquid crystal molecules in the liquid crystal layer 113 can be changed by a potential applied to each of the first transparent electrode 112-1, the second transparent electrode 112-2, the third transparent electrode 112-3, and the fourth transparent electrode 112-4. The refractive index distribution of the liquid crystal layer 113 changes as the alignments of the liquid crystal molecules changes. Therefore, the first liquid crystal cell 110 can diffuse light passing through it. The optical element 10 utilizes the changes in the refractive index distributions of the liquid crystal layer 113 of the first liquid crystal cell 110 and the liquid crystal layer 123 of the second liquid crystal cell 120, so that the light distribution or the light distribution patterns of light transmitted through the optical element 10 can be controlled.

[4. Control of Light Distribution or Light Distribution Patterns by Optical Element]

Control of a light distribution or a light distribution pattern by the optical element 10 is described in detail with reference to FIGS. 6A and 6B.

Figure 6A:
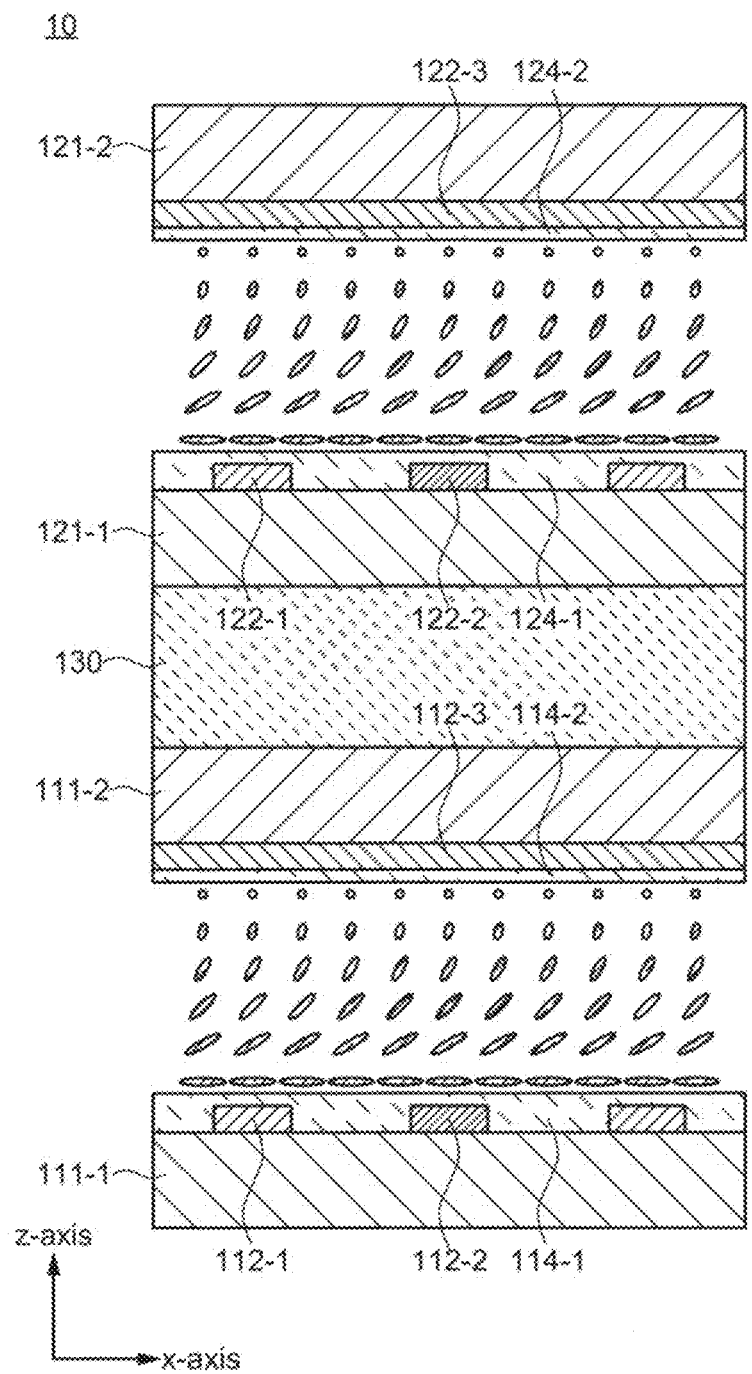
FIG. 6A is a schematic cross-sectional view illustrating control of light distribution by an optical element according to an embodiment of the present invention.
Figure 6A:
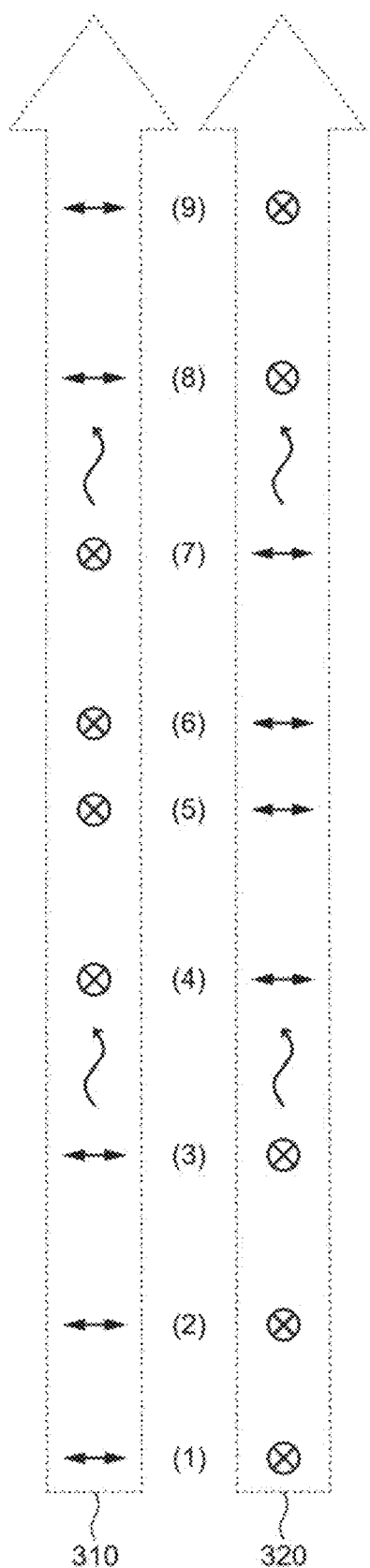
Figure 6B:
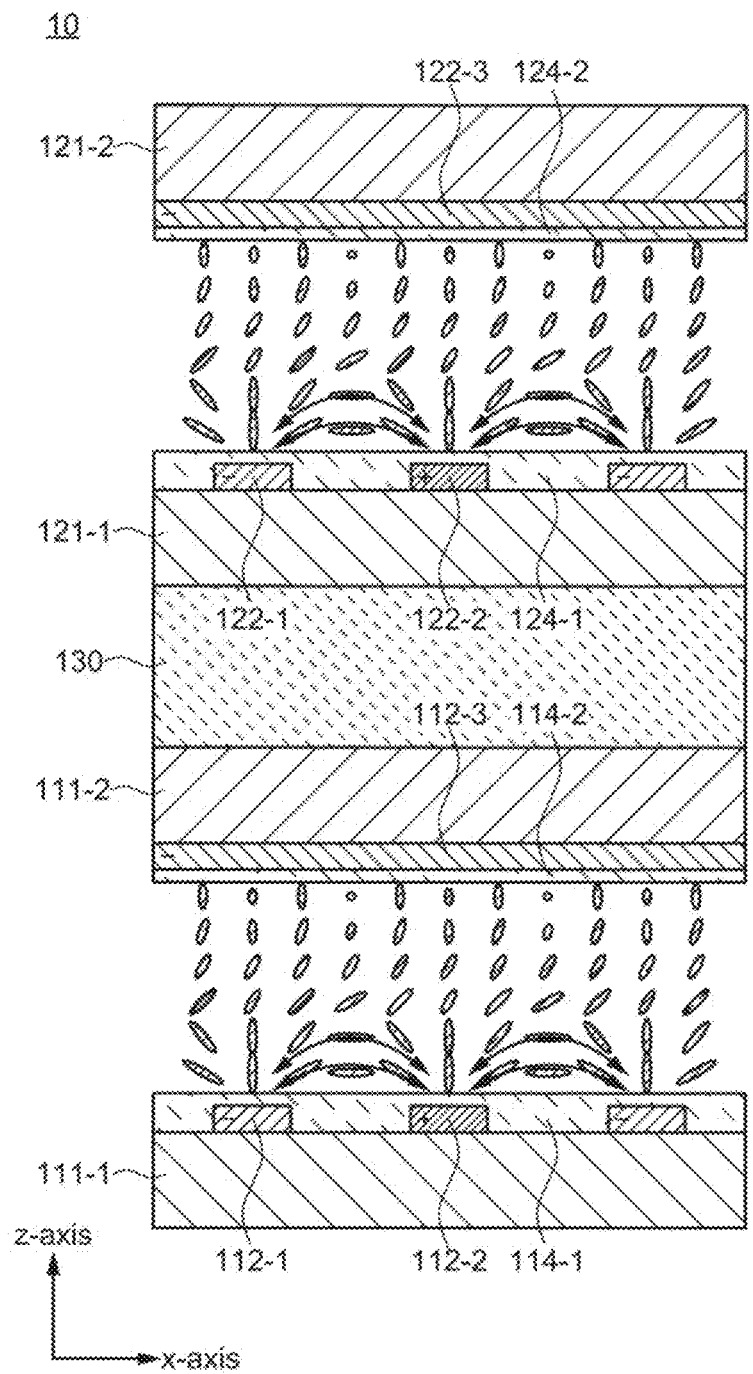
FIG. 6B is a schematic cross-sectional view illustrating control of light distribution by an optical element according to an embodiment of the present invention.
Figure 6B:
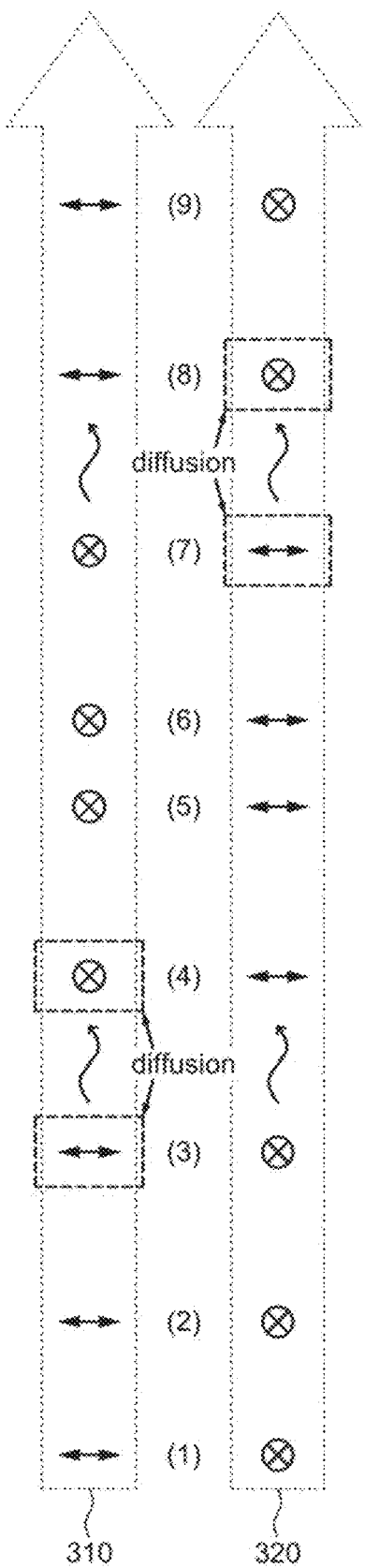

FIGS. 6A and 6B are schematic cross-sectional views illustrating control of a light distribution by the optical element 10 according to an embodiment of the present invention. The optical element 10 shown in FIGS. 6A and 6B corresponds to a part of the cross-sectional view of the first liquid crystal cell 110 and the second liquid crystal cell 120 shown in FIG. 2A. In the optical element shown in FIG. 6A, no potential is applied to any of the transparent electrodes. In the optical element 10 shown in FIG. 6B, a low potential is applied to the first transparent electrode 112-1 and the third transparent electrode 112-3 of the first liquid crystal cell 110, and a high potential is applied to the second transparent electrode 112-2 and the fourth transparent electrode 112-4. Similarly, a low potential is applied to the first transparent electrode 122-1 and the third transparent electrode 122-3 of the second liquid crystal cell 120, and a high potential is applied to the second transparent electrode 122-2 and the fourth transparent electrode 122-4. In FIG. 6B, for convenience, the low potential and the high potential are shown using the symbols "−" and "+", respectively.

In the optical element 10 shown in FIGS. 6A and 6B, the alignment treatment is performed on the first alignment film 114-1 of the first liquid crystal cell 110 and the first alignment film 124-1 of the second liquid crystal cell 120 along the x-axis direction. On the other hand, the alignment treatment is performed on the second alignment film 114-2 of the first liquid crystal cell 110 and the second alignment film 124-2 of the second liquid crystal cell 120 along the y-axis direction. Therefore, in the first liquid crystal cell 110, the alignment direction of the first alignment film 114-1 is the x-axis direction, and the alignment direction of the second alignment film 114-2 is the y-axis direction. Similarly, in the second liquid crystal cell 120, the alignment direction of the first alignment film 124-1 is the x-axis direction, and the alignment direction of the second alignment film 124-2 is the y-axis direction.

In the optical element 10 in which the first liquid crystal cell 110 and the second liquid crystal cell 120 are stacked, the first transparent electrode 112-1 of the first liquid crystal cell 110 and the first transparent electrode 122-1 of the second liquid crystal cell 120 overlap each other so as to substantially match in the extending direction in a plan view. The same configuration is applied to other transparent electrodes. However, the first liquid crystal cell 110 and the second liquid crystal cell 120 may be stacked so that the first transparent electrode 112-1 of the first liquid crystal cell 110 and the first transparent electrode 122-1 of the second liquid crystal cell 120 overlap each other with a slight deviation in the x-axis direction or the y-axis direction. More specifically, in a plan view, the first transparent electrode 112-1 of the first liquid crystal cell 110 and the first transparent electrode 122-1 of the second liquid crystal cell 120 partially or fully overlap each other in the extending direction. Alternatively, even if the first transparent electrode 112-1 of the first liquid crystal cell 110 and the first transparent electrode 122-1 of the second liquid crystal cell 120 do not overlap each other, the first transparent electrode 112-1 and the first transparent electrode 122-1 may extend in the same direction.

In FIGS. 6A and 6B, light enters from a direction perpendicular to the first substrate 111-1 of the first liquid crystal cell 110 and exits from the second substrate 121-2 of the second liquid crystal cell 120. Light incident on the first substrate 111-1 of the first liquid crystal cell 110 includes x-axis polarized light (P-polarized component) and y-axis polarized light (S-polarized component). Therefore, in the following, the process of transmission of these polarized components through the optical element 10 in FIG. 6B is described while the x-axis polarized light refers to a first polarized component 310 and the y-axis polarized light refers to a second polarized component 320, for convenience.

The first polarization component 310 and the second polarization component 320 respectively correspond to the P-polarized component and S-polarized component of the light emitted from the light source (see (1) in FIG. 6B). In FIGS. 6A and 6B, the P-polarized component is shown using an arrow (an arrow indicating the horizontal direction of the paper surface), and the S-polarized component is shown using a circle with a cross (an arrow indicating the normal direction of the paper surface).

The liquid crystal molecules of the liquid crystal layer 113 on the side of the first substrate 111-1 of the first liquid crystal cell 110 have the long axes aligned along the x-axis direction. When a lateral electric field is generated between the electrode 112-1 and the second transparent electrode 112-2, the liquid crystal molecules have a refractive index distribution in the x-axis direction. Further, the long axis of the liquid crystal molecules of the liquid crystal layer 113 on the side of the second substrate 111-2 of the first liquid crystal cell 110 is aligned along the y-axis direction. When a lateral electric field is generated between the third transparent electrode 112-3 and the fourth transparent electrode 112-4, the liquid crystal molecules have a refractive index distribution in the y-axis direction.

Therefore, after the first polarization component 310 incident on the optical element 10 (more specifically, the first liquid crystal cell 110) enters the first substrate 111-1, the first polarization component 310 changes its P-polarized component to the S-polarized component in accordance with the twist of the alignment of the liquid crystal as it approaches the second substrate 111-2 (see (2) to (4) in FIG. 6B). More specifically, although the first polarization component 310 has a polarization axis in the x-axis direction closer to the first substrate 111-1, the polarization axis gradually rotates in the process of passing through the liquid crystal layer 113 in the thickness direction. Thus, the first polarization component 310 has a polarization axis in the y-axis direction closer to the second substrate 111-2 and then is emitted from the second substrate 112-2 (see (5) in FIG. 6B). Here, as shown in FIG. 6B, when a lateral electric field is generated between the first transparent electrode 112-1 and the second transparent electrode 112-2, the alignment states of the liquid crystal molecules change due to the influence of the lateral electric field shown in FIG. 5A and the refractive index distribution changes. Further, since the polarization axis of the first polarization component 310 is parallel to the alignment direction of the liquid crystal molecules of the liquid crystal layer 113 on the side of the first substrate 111-1, the first polarization component 310 is diffused in the x-axis according to the refractive index distribution of the crystal molecules on the side of the first substrate 111-1. Furthermore, the polarization axis of the first polarization component 310 rotates from the x-axis to the y-axis in the liquid crystal layer 113, so that the polarization of the first polarization component 310 is parallel to the alignment direction of the liquid crystal molecules on the side of the second substrate 111-2. Here, as shown in FIG. 6B, when a lateral electric field is generated between the third transparent electrode 112-3 and the fourth transparent electrode 112-4, the alignment states of the liquid crystal molecules change due to the influence of the lateral electric field shown in FIG. 5B and the refractive index distribution changes. Therefore, the first polarization component 310 is also diffused in the y-axis direction according to the refractive index distribution of the liquid crystal molecules on the side of the second substrate 111-2.

Further, as shown in FIG. 6B, after the second polarization component 320 that has the S-polarized component before entering the optical element 10 (more specifically, the first liquid crystal cell 110) enters the first substrate 111-1, the second polarization component 320 changes its S-polarized component of to the P-polarized component in accordance with the twist of the alignment of the liquid crystal as it approaches to the second substrate 111-2 (see (2) to (4) in FIG. 6B). More specifically, although the second polarization component 320 has a polarization axis in the y-axis direction closer to the first substrate 111-1, the polarization axis gradually rotates in the process of passing through the liquid crystal layer 113 in the thickness direction. Thus, the second polarization component 320 has a polarization axis in the x-axis direction closer to the second substrate 112-2 and then is emitted from the second substrate 112-2 (see (5) in FIG. 6B). Here, even when a lateral electric field is generated between the first transparent electrode 112-1 and the second transparent electrode 112-2, the second polarization component 320 is not affected by the refractive index distribution of the liquid crystal molecules on the side of the first substrate 111-1 and passes through the liquid crystal layer 113 on the side of the first substrate 111-1 without being diffused because the polarization axis is orthogonal to the alignment direction of the liquid crystal molecules. Further, the polarization axis of the second polarization component 320 rotates from the y-axis direction to the x-axis direction in the liquid crystal layer 113. Therefore, the second polarization component 320 is not affected by the refractive index distribution of the liquid crystal molecules on the side of the second substrate 111-2 and pass through the liquid crystal 113 on the side of the second substrate 111-2 without being diffused because the polarization axis is orthogonal to the alignment direction of the liquid crystal molecules.

That is, although the polarization axis of the second polarization component 320 that has the S-polarized component before entering the optical element 10 changes from the y-axis to the x-axis, which corresponds to the P-polarized component, in the process of passing through the first liquid crystal cell 110, the diffusion similar to the first polarization component 310 does not occur.

The liquid crystal molecules of the liquid crystal layer 123 of the second liquid crystal cell 120 also have the same refractive index distribution as the liquid crystal molecules of the liquid crystal layer 113 of the first liquid crystal cell 110. Therefore, the same phenomenon as in the first liquid crystal cell 110 basically occurs also in the second liquid crystal cell 120. On the other hand, since the directions of the polarization axes of the first polarization component 310 and the second polarization component 320 are switched when passing through the first liquid cell 110, the polarization component affected by the refractive index distribution of the liquid crystal molecules in the liquid crystal layer 123 are also switched. That is, as shown in FIG. 6B, even when a lateral electric field is generated between the first transparent electrode 122-1 and the second transparent electrode 122-2 of the second liquid crystal cell 120 and between the third transparent electrode 122-3 and the fourth transparent electrode 122-3, the first polarization component 310 changes its polarization axis from the y-axis direction to the x-axis direction again (see (6) to (8) in FIG. 6B) without being diffused. On the other hand, the second polarization component 320 changes its polarization axis from the x-axis direction to the y-axis direction again with being diffused by the influence of the refractive index distribution of the liquid crystal molecules of the liquid crystal layer 123.

As can be seen from the above, in the optical element 10, by stacking two liquid crystal cells having the same structure, the polarization direction of the light incident on the optical element 10 changes twice. Thus, the same polarization direction of light before entering the optical element 10 and after being emitted from the optical element 10 can be maintained (see (1) and (9) in FIG. 6B). On the other hand, in the optical element 10, the refractive index distribution of the liquid crystal molecules of the liquid crystal layer in the liquid crystal cell can change and the transmitted light can be refracted. More specifically, the first liquid crystal cell 110 diffuses the light of the first polarization component 310 (P-polarized component) in the x-axis direction, the y-axis direction, or both the x-axis and y-axis directions, and the liquid crystal cell 120 diffuses the light of the second polarization component 320 (the S-polarized component) in the x-axis direction, the y-axis direction, or both the x-axis and y-axis directions. Therefore, the optical element 10 can diffuse unpolarized light without changing the polarization state of the light.

Further, in the above description, the process of diffusing the light and changing the polarization axis when each polarization component passes through the optical element 10 is described with reference to mainly FIG. 6B. The optical element 10 in FIG. 6A is in a state where no potential is applied to each transparent electrode (a state in which there is no potential difference between adjacent transparent electrodes), and the optical element 10 changes the polarization axis of the polarization component the same as the optical element in FIG. 6B except that the polarization component is not diffused. To avoid a duplication of the description, the description of the polarization components passing through the optical element 10 in FIG. 6A is given the same reference numerals as (1) to (9) in FIG. 6B, and the description thereof is omitted.

In addition, as shown in FIGS. 6A and 6B, the optical elastic resin layer 130 is provided between the first liquid crystal cell 110 and the second liquid crystal cell 120. The light can be refracted in the interface between the second substrate 111-2 of the first liquid crystal cell 110 and the optical elastic resin layer 130 or the interface between the first substrate 121-1 of the second liquid crystal cell 120 and the optical elastic resin layer 130. Therefore, the refractive index of the optical elastic resin of the optical elastic resin layer 130 is close to the refractive index of the second substrate 111-2 of the first liquid crystal cell 110 and the refractive index of the first substrate 121-1 of the second liquid crystal cell 120. Further, the optical element 10 is placed at a position close to the light source, so that the temperature of the optical element 10 may rise due to the heat from the light source. In this case, the thickness of the optical elastic resin layer 130 is preferably larger than the inter-substrate distance d corresponding to a distance between the first substrate 111-1 and the second substrate 111-2 in the first liquid crystal cell 110 or the first substrate 121-1 and the second substrate 121-2 in the second liquid crystal cell 120 so that the influence of the thermal expansion of the optical resin in the optical elastic resin layer can be reduced.

The optical element 10 can not only diffuse light, but can also control the light distribution according to a potential applied to each transparent electrode to form a predetermined light distribution pattern. In the following description, some examples of light distribution patterns controlled using the optical element 10 with reference to FIGS. 7A to 10 are described. However, the light distribution pattern controlled by the optical element 10 is not limited to these examples. In addition, Table 1 shows signs of potentials (V11, etc.) shown in FIGS. 7A to 10.

TABLE 1

| First liquid crystal cell 110 | First electrode 112-1 | $V_{11}$ |
|---|---|---|
| | Second electrode 112-2 | $V_{12}$ |
| | Third electrode 112-3 | $V_{13}$ |
| | Fourth electrode 112-4 | $V_{14}$ |
| Second liquid crystal cell 120 | First electrode 122-1 | $V_{21}$ |
| | Second electrode 122-2 | $V_{22}$ |
| | Third electrode 122-3 | $V_{23}$ |
| | Fourth electrode 122-4 | $V_{24}$ |

In the following description, for convenience, the potential applied to each transparent electrode is defined as a first potential (a variable potential, for example, 0 V for a low potential and 30 V for a high potential), a second potential having a phase opposite to the first potential (a variable potential, for example, 0 V for low potential and 30 V for high potential), or a third potential (an intermediate potential, for example, 15 V). The third potential is a potential between the low potential and the high potential, and may be a fixed potential or a variable potential. In addition, the values of the potentials are not limited to 0 V, 15 V, and 30 V shown in FIGS. 7A to 10.

Example 1: Light Distribution Pattern Spreading in the X-Axis Direction

Figure 7A:
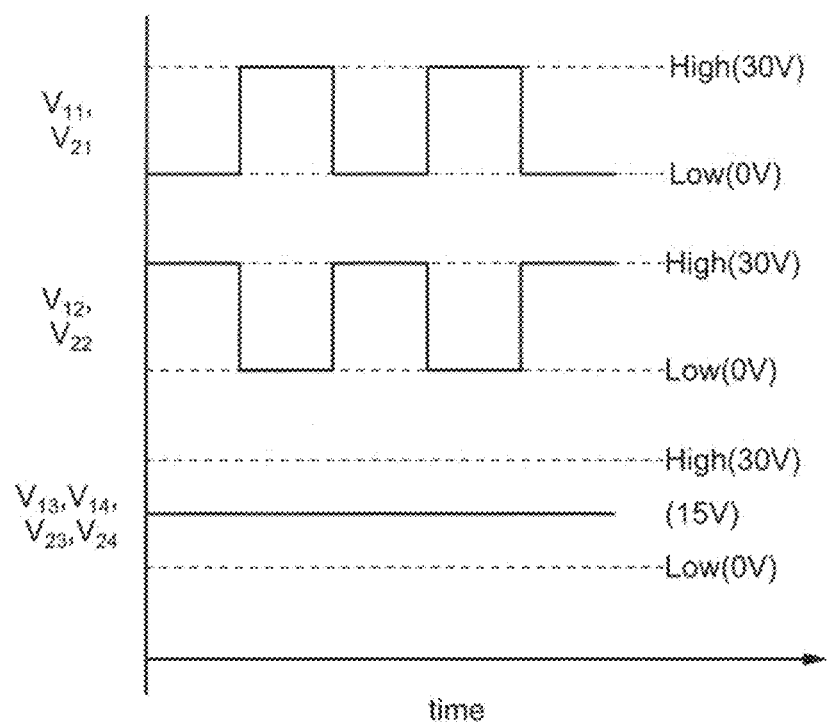
FIG. 7A is a timing chart showing potentials applied to respective transparent electrodes included in an optical element according to an embodiment of the present invention.
Figure 7B:
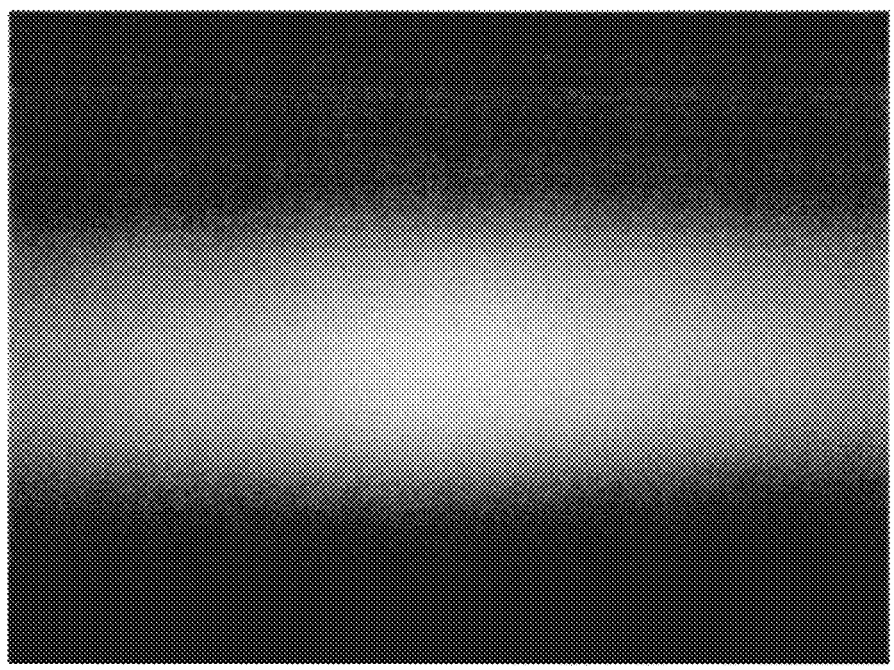
FIG. 7B is a photograph of a light distribution pattern obtained by applying the potentials shown in FIG. 7A to respective transparent electrodes in an optical element according to an embodiment of the present invention.

FIG. 7A is a timing chart showing potentials applied to respective transparent electrodes included in the optical element 10 according to an embodiment of the present invention. FIG. 7B is a photograph of a light distribution pattern obtained by applying the potentials shown in FIG. 7A to respective transparent electrodes in the optical element 10 according to an embodiment of the present invention.

In the first liquid crystal cell 110, the first potential and the second potential are applied to the first transparent electrode 112-1 and the second transparent electrode 112-2, respectively. Further, the third potential is applied to each of the third transparent electrode 112-3 and the fourth transparent electrode 112-4. The phases of the first potential applied to the first transparent electrode 112-1 and the second potential applied to the second transparent electrode 112-2 are inverted. Therefore, a potential difference (for example, +30 V or −30 V) is generated between the first transparent electrode 112-1 and the second transparent electrode 112-2. On the other hand, there is no potential difference between the third transparent electrode 112-3 and the fourth transparent electrode 112-4 on the side of the second substrate 111-2. Further, a potential difference of +15 V or −15 V is generated between the third transparent electrode 112-3 or the fourth transparent electrode 112-4 on the side of the second substrate 111-2 and the first transparent electrode 112-1 on the side of the first substrate 111-1, and between the third transparent electrode 112-3 or the fourth transparent electrode 112-4 on the side of the second substrate 111-2 and the second transparent electrode 112-2 on the side of the first substrate 111-1, even when any potential is applied to the third transparent electrode 112-3 and the fourth transparent electrode 112-4 on the side of the second substrate 112-2. There is no bias in the potential difference between one transparent electrode and the other transparent electrode on the side of the first substrate 111-1 in terms of absolute values.

As a result, the alignment states of the liquid crystal molecules on the side of the first substrate 111-1 changes according to the potential difference between the first transparent electrode 112-1 and the second transparent electrode 112-2 (see FIGS. 5A to 5C etc.). On the other hand, no potential difference occurs between the third transparent electrode 112-3 and the fourth transparent electrode 112-4, and the second substrate 111-2 is far enough from the first substrate 111-1 that the liquid crystal molecules on the side of the second substrate 111-2 are not affected by the potential on the side of the first substrate 111-1. Thus, the alignment direction of the liquid crystal molecules on the side of the second substrate 111-2 hardly changes from the initial alignment direction. Further, since the third potential applied to the third transparent electrode 112-3 and the fourth transparent electrode 112-4 is an intermediate potential between the first potential and the second potential, no capacitance is accumulated even when the low potential and the high potential are alternatively applied to the first transparent electrode 112-1 and the second transparent 112-2, and the alignment states of the liquid crystal molecules on the side of the second substrate 111-2 do not change.

In the second liquid crystal cell 120, the first potential and the second potential are applied to the first transparent electrode 122-1 and the second transparent electrode 122-2, respectively. Further, the third potential is applied to each of the third transparent electrode 122-3 and the fourth transparent electrode 122-4. The phases of the first potential applied to the first transparent electrode 122-1 and the second potential applied to the second transparent electrode 122-2 are inverted. Therefore, a potential difference (for example, +30 V or −30 V) is generated between the first transparent electrode 122-1 and the second transparent electrode 122-2. On the other hand, there is no potential difference between the third transparent electrode 122-3 and the fourth transparent electrode 122-4 on the side of the second substrate 121-2. Further, a potential difference of +15 V or −15 V is generated between the third transparent electrode 122-3 or the fourth transparent electrode 122-4 on the side of the second substrate 121-2 and the first transparent electrode 122-1 on the side of the first substrate 121-1, and between the third transparent electrode 122-3 or the fourth transparent electrode 122-4 on the side of the second substrate 121-2 and the second transparent electrode 122-3 on the side of the first substrate 121-1, even when any potential is applied to the third transparent electrode 122-3 and the fourth transparent electrode 122-4 on the side of the second substrate 121-2. There is no bias in the potential difference between one transparent electrode and the other transparent electrode on the side of the first substrate 121-1 in terms of absolute values.

As a result, the alignment states of the liquid crystal molecules on the side of the first substrate 121-1 changes according to the potential difference between the first transparent electrode 122-1 and the second transparent electrode 122-2 (see FIGS. 5A to 5C etc.). On the other hand, no potential difference occurs between the third transparent electrode 122-3 and the fourth transparent electrode 122-4, and the second substrate 121-2 is far enough from the first substrate 121-1 that the liquid crystal molecules on the side of the second substrate 121-2 are not affected by the potential on the side of the first substrate 121-1. Thus, the alignment direction of the liquid crystal molecules on the side of the second substrate 121-2 hardly changes from the initial alignment direction. Further, since the third potential applied to the third transparent electrode 122-3 and the fourth transparent electrode 122-4 is an intermediate potential between the first potential and the second potential, no capacitance is accumulated even when the low potential and the high potential are alternatively applied to the first transparent electrode 122-1 and the second transparent 122-2, and the alignment states of the liquid crystal molecules on the side of the second substrate 121-2 do not change.

Further, as shown in FIG. 7A, both of the periodical potential change between the first transparent electrode 112-1 and the second transparent electrode 112-2 of the first liquid crystal cell 110 and between the first transparent electrode 122-1 and the second transparent electrode 122-2 of the second liquid crystal cell 120 are synchronized each other.

When the potentials as described above are applied to respective transparent electrodes, the liquid crystal molecules of the liquid crystal layer 113 on the side of the first substrate 111-1 of the first liquid crystal cell 110 can refract the light having the polarization in the x-axis direction in the x-axis direction. Therefore, the first liquid crystal cell 110 can diffuse the light having the polarization in the x-axis direction in the x-axis direction.

Further, the liquid crystal molecules of the liquid crystal layer 123 on the side of the first substrate 121-1 of the second liquid crystal cell 120 can also refract the light having the polarization in the x-axis direction in the x-axis direction. Therefore, the second liquid crystal cell 120 also diffuses the light having the polarization in the x-axis direction in the x-axis direction.

That is, in the case that potentials of respective transparent electrodes correspond to the potentials shown in FIG. 7A, when light is incident from the side of the first substrate 111-1 of the first liquid crystal cell 110 (This means that light is irradiated from the lower side of the first liquid crystal cell 110 toward the first substrate 111-1 as shown in FIGS. 6A and 6B. The same shall apply hereinafter.), the optical element 10 diffuses the first polarization component 310 having the polarization axis in the x-axis direction in the x-axis direction on the side of the first substrate 111-1 while the polarization axis changes from the x-axis direction to the y-axis direction in the process of passing through the first liquid crystal cell 110. On the other hand, the second polarization component 320 having the polarization in the y-axis is not diffused while the polarization axis changes from the y-axis direction to the x-axis direction. Then, these polarization components enter the second liquid crystal cell 120. The optical element 10 diffuses the second polarization component 320, of which the polarization axis changes from the y-axis direction to the x-axis direction without diffusing in the first liquid crystal cell 110, in the x-axis direction on the side of the first substrate 121-1 while the polarization axis changes from the x-axis direction to the y-axis direction in the process of passing through the second liquid crystal cell 120. On the other hand, the first polarization component 310 is not diffused while the polarization axis changes from the y-axis direction to the x-axis direction. As a result, the light incident on the optical element 10 is diffused in the x-direction in the process of passing through the first liquid crystal cell 110 and the second liquid crystal cell 120. Therefore, the light transmitted through the optical element 10 can form a light distribution pattern A spreading in the x-axis direction, as shown in FIG. 7B.

Example 2: Light Distribution Pattern Spreading in the Y-Axis Direction

Figure 8A:
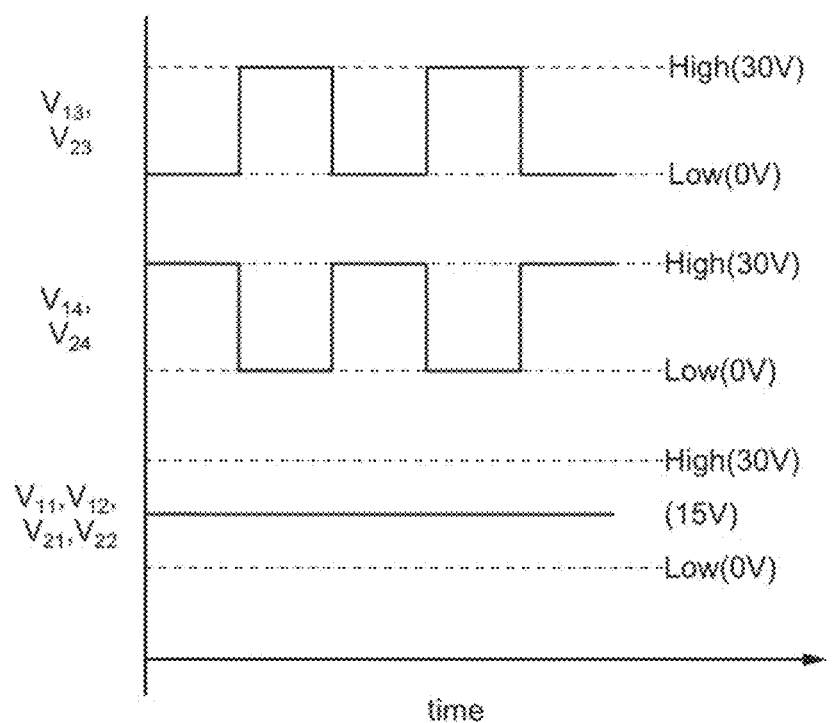
FIG. 8A is a timing chart showing potentials applied to respective transparent electrodes included in the optical element according to one embodiment of the present invention.
Figure 8B:
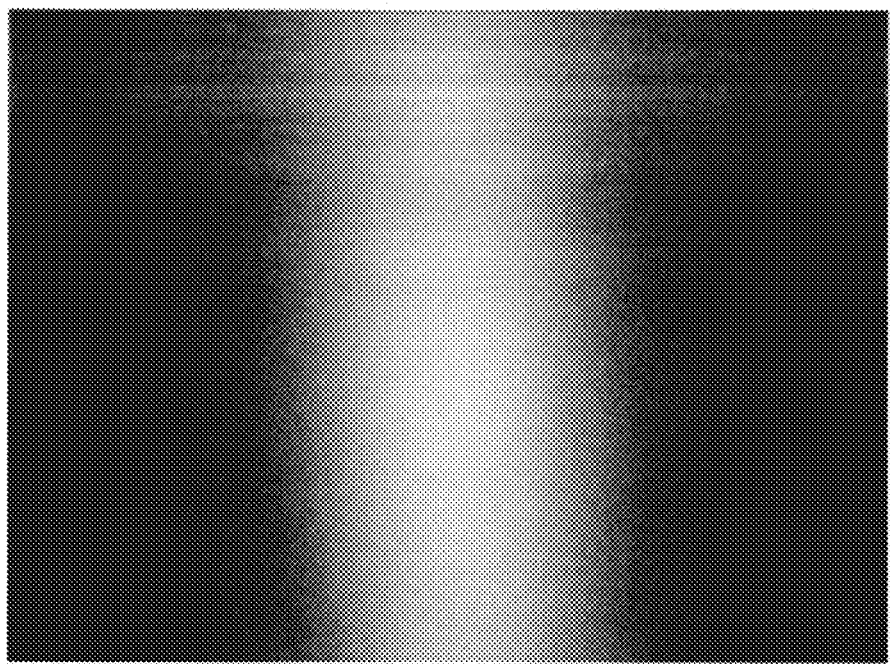
FIG. 8B is a photograph of a light distribution pattern obtained by applying the potentials shown in FIG. 8A to respective transparent electrodes in an optical element according to an embodiment of the present invention.

FIG. 8A is a timing chart showing potentials applied to respective transparent electrodes included in the optical element 10 according to an embodiment of the present invention. FIG. 8B is a photograph of a light distribution pattern obtained by applying the potentials shown in FIG. 8A to respective transparent electrodes in the optical element 10 according to an embodiment of the present invention.

In the first liquid crystal cell 110, the third potential is applied to each of the first transparent electrode 112-1 and the second transparent electrode 112-2. Further, the first potential and the second potential are applied to the third transparent electrode 112-3 and the fourth transparent electrode, respectively. The phases of the first potential applied to the third transparent electrode 112-3 and the second potential applied to the fourth transparent electrode 112-4 are inverted. Therefore, a potential difference (for example, +30 V or −30 V) is generated between the third transparent electrode 112-3 and the fourth transparent electrode 112-4. On the other hand, there is no potential difference between the first transparent electrode 112-1 and the second transparent electrode 112-2 on the side of the first substrate 111-1. Further, a potential difference of +15 V or −15 V is generated between the first transparent electrode 112-1 or the second transparent electrode 112-2 on the side of the first substrate 111-1 and the third transparent electrode 112-3 on the side of the second substrate 111-2, and between the first transparent electrode 112-1 or the second transparent electrode 112-2 on the side of the first substrate 111-1 and the fourth transparent electrode 112-4 on the side of the second substrate 111-2, even when any potential is applied to the first transparent electrode 112-1 and the second transparent electrode 112-2 on the side of the first substrate 112-2. There is no bias in the potential difference between one transparent electrode and the other transparent electrode on the side of the second substrate 111-2 in terms of absolute values.

As a result, the alignment states of the liquid crystal molecules on the side of the second substrate 111-2 change according to the potential difference between the third transparent electrode 112-3 and the fourth transparent electrode 112-4 (see FIGS. 5A to 5C etc.). On the other hand, no potential difference occurs between the first transparent electrode 112-1 and the second transparent electrode 112-2, and the first substrate 111-1 is far enough from the second substrate 111-2 that the liquid crystal molecules on the side of the first substrate 111-1 are not affected by the potential on the side of the second substrate 111-2. Thus, the alignment direction of the liquid crystal molecules on the side of the first substrate 111-1 hardly changes from the initial alignment direction. Further, since the third potential applied to the first transparent electrode 112-1 and the second transparent electrode 112-2 is an intermediate potential between the first potential and the second potential, no capacitance is accumulated even when the low potential and the high potential are alternatively applied to the third transparent electrode 112-3 and the fourth transparent 112-4, and the alignment states of the liquid crystal molecules on the side of the first substrate 111-1 do not change.

In the second liquid crystal cell 120, the third potential is applied to each of the first transparent electrode 122-1 and the second transparent electrode 122-2. Further, the first potential and the second potential are applied to the third transparent electrode 122-3 and the fourth transparent electrode 122-4, respectively. The phases of the first potential applied to the third transparent electrode 122-3 and the second potential applied to the fourth transparent electrode 122-2 are inverted. Therefore, a potential difference (for example, +30 V or −30 V) is generated between the third transparent electrode 122-3 and the fourth transparent electrode 122-4. On the other hand, there is no potential difference between the first transparent electrode 122-1 and the second transparent electrode 122-2 on the side of the first substrate 121-1. Further, a potential difference of +15 V or −15 V is generated between the first transparent electrode 122-1 or the second transparent electrode 122-2 on the side of the first substrate 121-1 and the third transparent electrode 122-3, and between the first transparent electrode 122-1 or the second transparent electrode 122-4 on the side of the first substrate 121-1 and the fourth transparent electrode 122-4 on the side of the second substrate 121-2 even when any potential is applied to the first transparent electrode 122-1 and the second transparent electrode 122-2 on the side of the first substrate 121-1. There is no bias in the potential difference between one transparent electrode and the other transparent electrode on the side of the second substrate 121-2 in terms of absolute values.

As a result, the alignment states of the liquid crystal molecules on the side of the second substrate 121-2 change according to the potential difference occurs between the third transparent electrode 122-3 and the fourth transparent electrode 122-4 (see FIGS. 5A to 5C etc.). On the other hand, no potential difference between the first transparent electrode 122-1 and the second transparent electrode 122-2, and the first substrate 121-1 is far enough from the second substrate 121-2 that the liquid crystal molecules on the side of the first substrate 121-1 are not affected by the potential on the side of the second substrate 111-2. Thus, the alignment direction of the liquid crystal molecules on the side of the first substrate 121-1 hardly changes from the initial alignment direction. Further, since the third potential applied to the first transparent electrode 122-1 and the second transparent electrode 122-2 is an intermediate potential between the first potential and the second potential, no capacitance is accumulated even when the low potential and the high potential are alternatively applied to the third transparent electrode 122-3 and the fourth transparent 122-4, and the alignment states of the liquid crystal molecules on the side of the first substrate 121-1 do not change.

Further, as shown in FIG. 8A, both of the periodical potential change between of the third transparent electrode 112-3 and the fourth transparent electrode 112-4 of the first liquid crystal cell 110 and between the third transparent electrode 122-3 and the fourth transparent electrode 122-4 of the second liquid crystal cell 120 are synchronized each other.

When the potentials as described above are applied to respective transparent electrodes, the liquid crystal molecules of the liquid crystal layer 113 on the side of the second substrate 111-2 of the first liquid crystal cell 110 refract the light having the polarization in the y-axis direction in the y-axis direction. Therefore, the first liquid crystal cell 110 diffuses the light having the polarization in the y-axis direction in the y-axis direction.

Further, the liquid crystal molecules of the liquid crystal layer 123 on the side of the second substrate 121-2 of the second liquid crystal cell 120 also refract the light having the polarization in the y-axis direction in the y-axis direction. Therefore, the second liquid crystal cell 120 also diffuses the light having the polarization in the y-axis direction in the y-axis direction.

That is, in the case that potentials of respective transparent electrodes correspond to the potentials shown in FIG. 8A, when light is incident from the side of the first substrate 111-1 of the first liquid crystal cell 110, the optical element 10 diffuses the first polarization component 310 having the polarization axis in the x-axis direction in the y-axis direction on the side of the second substrate 111-2 while the polarization axis changes from the x-axis to the y-axis direction in the process of passing through the first liquid crystal cell 110. On the other hand, the second polarization component 320 having the polarization in the y-axis is not diffused while the polarization axis changes from the y-axis direction to the x-axis direction. Then, these polarization components enter the second liquid crystal cell 120. The optical element 10 diffuses the second polarization component 320, of which the polarization axis changes from the y-axis direction to the x-axis direction without diffusing in the first liquid crystal cell 110, in the y-axis direction on the side of the second substrate 121-2 while the polarization axis changes from the x-axis direction to the y-axis direction in the process of passing through the second liquid crystal cell 120. On the other hand, the first polarization component 310, of which the polarization axis changes from the x-direction to the y-direction while continuing to diffuse in the first liquid crystal cell 110, is not diffused while the polarization axis changes from the y-axis direction to the x-axis direction. As a result, the light incident on the optical element 10 is diffused in the y-direction in the process of passing through the first liquid crystal cell 110 and the second liquid crystal cell 120. Therefore, the light transmitted through the optical element 10 can form a light distribution pattern B spreading in the y-axis direction, as shown in FIG. 8B.

Example 3: Light Distribution Pattern Spreading in a Cross

Figure 9A:
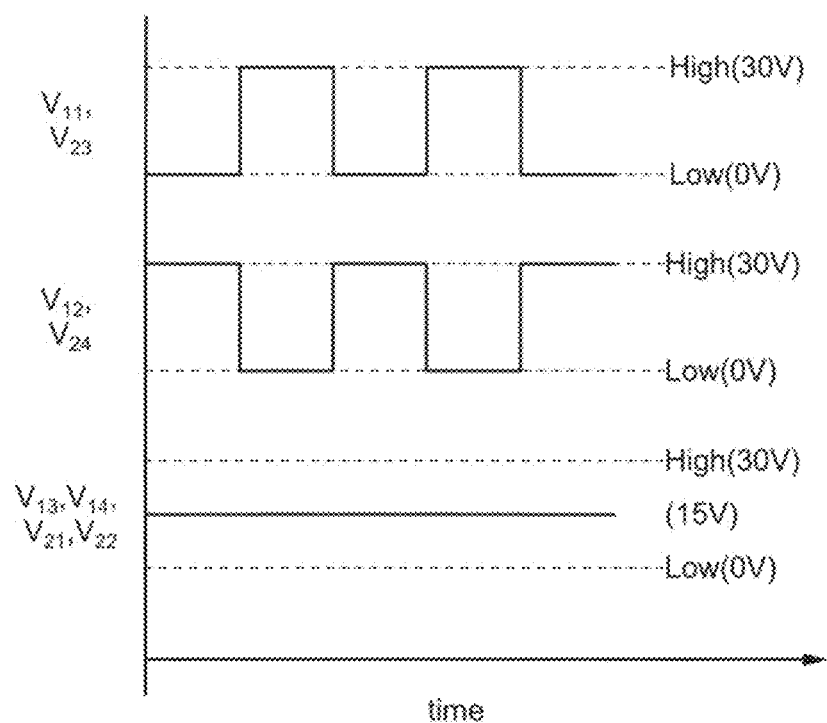
FIG. 9A is a timing chart showing potentials applied to respective transparent electrode included in the optical element according to an embodiment of the present invention.
Figure 9B:
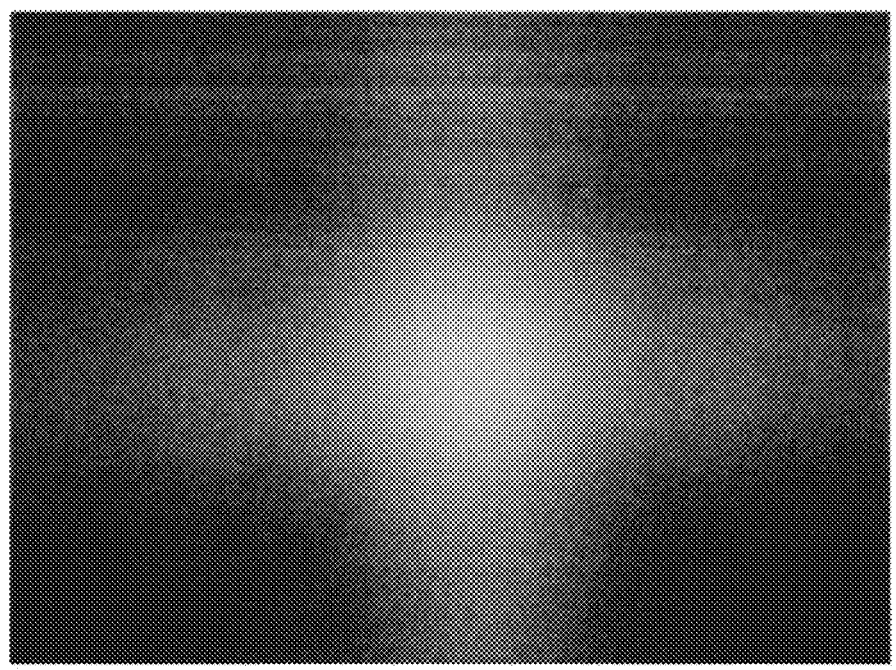
FIG. 9B is a photograph of a light distribution pattern obtained by applying the potentials shown in FIG. 9A to respective transparent electrodes in an optical element according to an embodiment of the present invention.

FIG. 9A is a timing chart showing potentials applied to respective transparent electrodes included in the optical element 10 according to an embodiment of the present invention. FIG. 9B is a photograph of a light distribution pattern obtained by applying the potentials shown in FIG. 9A to respective transparent electrodes in the optical element 10 according to an embodiment of the present invention.

In the first liquid crystal cell 110, the first potential and the second potential are applied to the first transparent electrode 112-1 and the second transparent electrode 112-2, respectively. Further, the third potential is applied to each of the third transparent electrode 112-3 and the fourth transparent electrode 112-4. The phases of the first potential applied to the first transparent electrode 112-1 and the second potential applied to the second transparent electrode 112-2 are inverted. Therefore, a potential difference (for example, +30 V or −30 V) is generated between the first transparent electrode 112-1 and the second transparent electrode 112-2. On the other hand, there is no potential difference between the third transparent electrode 112-3 and the fourth transparent electrode 112-4 on the side of the second substrate 111-2. Further, a potential difference of +15 V or −15 V is generated between the third transparent electrode 112-3 or the fourth transparent electrode 112-4 on the side of the second substrate 111-2 and the first transparent electrode 112-1 on the side of the first substrate 111-1, and between the third transparent electrode 112-3 or the fourth transparent electrode 112-4 on the side of the second substrate 111-2 and the second transparent electrode 112-2 on the side of the first substrate 111-1, even when any potential is applied to the third transparent electrode 112-3 and the fourth transparent electrode 112-4 on the side of the second substrate 112-4. There is no bias in the potential difference between one transparent electrode and the other transparent electrode on the side of the first substrate 111-1 in terms of absolute values.

As a result, the alignment states of the liquid crystal molecules on the side of the first substrate 111-1 change according to the potential difference occurs between the first transparent electrode 112-1 and the second transparent electrode 112-2 (see FIGS. 5A to 5C etc.). On the other hand, no potential difference between the third transparent electrode 112-3, and the fourth transparent electrode 112-4 and the second substrate 111-2 is far enough from the first substrate 111-1 that the liquid crystal molecules on the side of the second substrate 111-2 are not affected by the potential on the side of the first substrate 111-1. Thus, the alignment direction of the liquid crystal molecules on the side of the second substrate 111-2 hardly changes from the initial alignment direction. Further, since the third potential applied to the third transparent electrode 112-3 and the fourth transparent electrode 112-4 is an intermediate potential between the first potential and the second potential, no capacitance is accumulated even when the low potential and the high potential are alternatively applied to the first transparent electrode 112-1 and the second transparent 112-2, and the alignment states of the liquid crystal molecules on the side of the second substrate 111-2 do not change.

In the second liquid crystal cell 120, the third potential is applied to each of the first transparent electrode 122-1 and the second transparent electrode 122-2. Further, the first potential and the second potential are applied to the third transparent electrode 122-3 and the fourth transparent electrode 122-4, respectively. The phases of the first potential applied to the third transparent electrode 122-3 and the second potential applied to the fourth transparent electrode 122-2 are inverted. Therefore, a potential difference (for example, +30 V or −30 V) is generated between the third transparent electrode 122-3 and the fourth transparent electrode 122-4. On the other hand, there is no potential difference between the first transparent electrode 122-1 and the second transparent electrode 122-2 on the side of the first substrate 121-1. Further, a potential difference of +15 V or −15 V is generated between the first transparent electrode 122-1 or the second transparent electrode 122-2 on the side of the first substrate 121-1 and the third transparent electrode 122-3, and between the first transparent electrode 122-1 or the second transparent electrode 122-4 on the side of the first substrate 121-1 and the fourth transparent electrode 122-4 on the side of the second substrate 121-2, even when any potential is applied to the first transparent electrode 122-1 and the second transparent electrode 122-2 on the side of the first substrate 121-1. There is no bias in the potential difference between one transparent electrode and the other transparent electrode on the side of the second substrate 121-2 in terms of absolute values.

As a result, the alignment states of the liquid crystal molecules on the side of the second substrate 121-2 change according to the potential difference between the third transparent electrode 122-3 and the fourth transparent electrode 122-4 (see FIGS. 5A to 5C etc.). On the other hand, no potential difference occurs between the first transparent electrode 122-1 and the second transparent electrode 122-2, and the first substrate 121-1 is far enough from the second substrate 121-2 that the liquid crystal molecules on the side of the first substrate 121-1 are not affected by the potential on the side of the second substrate 111-2. Thus, the alignment direction of the liquid crystal molecules on the side of the first substrate 121-1 hardly changes from the initial alignment direction. Further, since the third potential applied to the first transparent electrode 122-1 and the second transparent electrode 122-2 is an intermediate potential between the first potential and the second potential, no capacitance is accumulated even when the low potential and the high potential are alternatively applied to the third transparent electrode 122-3 and the fourth transparent 122-4, and the alignment states of the liquid crystal molecules on the side of the first substrate 121-1 do not change.

Further, as shown in FIG. 9A, both of the periodical potential change between the third transparent electrode 112-3 and the fourth transparent electrode 112-4 of the first liquid crystal cell 110 and between the third transparent electrode 122-3 and the fourth transparent electrode 122-4 of the second liquid crystal cell 120 are synchronized each other.

When the potentials as described above are applied to respective transparent electrodes, the liquid crystal molecules of the liquid crystal layer 113 on the side of the first substrate 111-1 of the first liquid crystal cell 110 refract the light having the polarization in the x-axis direction in the x-axis direction. Therefore, the first liquid crystal cell 110 diffuses the light having the polarization in the x-axis direction in the x-axis direction.

Further, the liquid crystal molecules of the liquid crystal layer 123 on the side of the second substrate 121-2 of the second liquid crystal cell 120 refract the light having the polarization in the y-axis direction in the y-axis direction. Therefore, the second liquid crystal cell 120 diffuses the light having the polarization in the y-axis direction in the y-axis direction.

That is, in the case that potentials of respective transparent electrodes correspond to the potentials shown in FIG. 9A, when light is incident from the side of the first substrate 111-1 of the first liquid crystal cell 110, the optical element 10 diffuses the first polarization component 310 having the polarization axis in the x-axis direction in x-axis direction on the side of the first substrate 111-1 while the polarization axis changes from the x-axis direction to the y-axis direction in the process of passing through the first liquid crystal cell 110. On the other hand, the second polarization component 320 having the polarization in the y-axis is not diffused while the polarization axis changes from the y-axis direction to the x-axis direction. Then, these polarization components enter the second liquid crystal cell 120. The optical element 10 diffuses the second polarization component 320, of which the polarization axis changes from the y-axis direction to the x-axis direction without diffusing in the first liquid crystal cell 110, in the y-axis direction on the side of the second substrate 121-2 while the polarization axis changes from the x-axis direction to the y-axis direction in the process of passing through the second liquid crystal cell 120. On the other hand, the first polarization component 310, of which the polarization axis changes from the x-direction to the y-direction while continuing to diffuse in the first liquid crystal cell 110, is not diffused while the polarization axis changes from the y-axis direction to the x-axis direction. As a result, the first polarization component 310 of the light incident on the optical element 10 is diffused in the x-direction in the process of passing through the first liquid crystal cell 110 and the second polarization component 310 of the light incident on the optical element 10 is diffused in the y-axis direction in the process of passing through the second crystal cell 120. Therefore, the light transmitted through the optical element 10 can form a light distribution pattern C spreading in a cross, as shown in FIG. 9B.

As described above, the light distribution pattern with a cross shape is formed by applying the potentials shown in FIG. 9A to the respective transparent electrodes and mainly diffusing the first polarization component 310. However, the light distribution pattern with the cross shape can be formed to diffuse the second polarization component 320 by changing potentials applied to the respective transparent electrodes. Specifically, in the first liquid crystal cell 110, the first potential and the second potential are applied to the third transparent electrode 112-3 and the fourth transparent electrode 112-4, respectively, and the third potential is applied to each of the first transparent electrode 112-1 and the second transparent electrode 112-2. Further, in the second liquid crystal cell 120, the first potential and the second potential are applied to the first transparent electrode 122-1 and the second transparent electrode 122-2 and the third potential is applied to each of the third transparent electrode 122-3 and the fourth transparent electrode 122-4. As a result, the light distribution pattern is formed by mainly diffusing the second polarization component 320.

Example 4: Light Distribution Pattern Spreading in a Rectangular Shape

Figure 10:
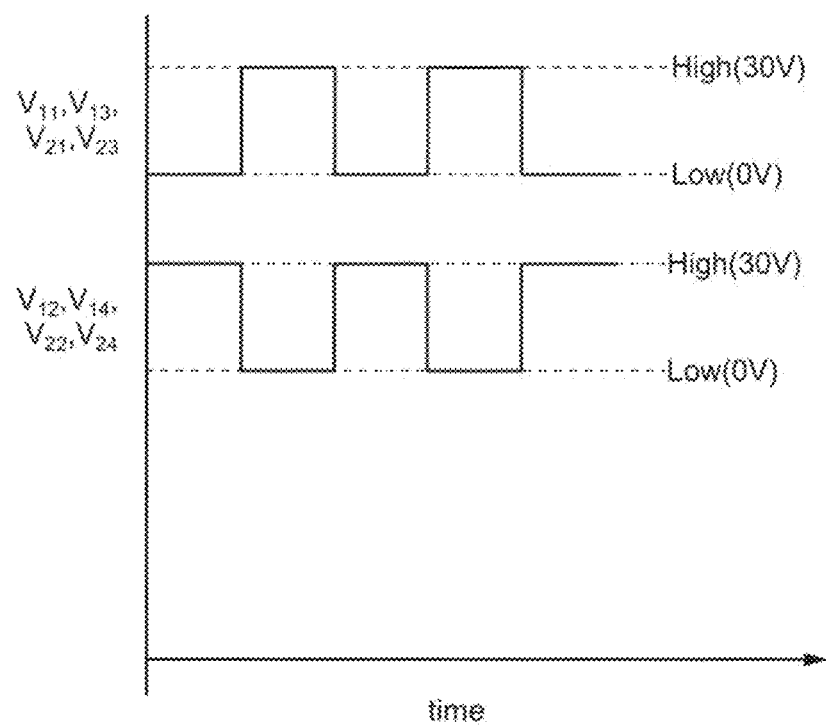
FIG. 10 is a timing chart showing potentials applied to respective transparent electrodes included in an optical element according to an embodiment of the present invention.

FIG. 10 is a timing chart showing potentials applied to respective transparent electrodes included in the optical element 10 according to an embodiment of the present invention.

In the first liquid crystal cell 110, the first potential is applied to each of the first transparent electrode 112-1 and the third transparent electrode 112-3. Further, the second potential is applied to each of the second transparent electrode 112-2 and the fourth transparent electrode 112-4. The phases of the first potential applied to the first transparent electrode 112-1 and the third transparent electrode 112-3 and the second potential applied to the second transparent electrode 112-2 and the fourth transparent electrode 112-4 are inverted. Therefore, potential differences (for example, +30 V or −30 V) are generated between the first transparent electrode 112-1 and the second transparent electrode 112-2 and between the third transparent electrode 112-3 and the fourth transparent electrode 112-4. Further, potential differences (for example, +30 V or −30 V) are generated between the first transparent electrode 112-1 and the fourth transparent electrode 112-4 and between the second transparent electrode 112-2 and the third transparent electrode 112-3.

As a result, the alignment states of the liquid crystal molecules on the side of the first substrate 111-1 change according to the potential difference occurs between the first transparent electrode 112-1 and the second transparent electrode 112-2 (see FIGS. 5A to 5C etc.). Further, the alignment states of the liquid crystal molecules on the side of the second substrate 111-2 change according to the potential difference between the third transparent electrode 112-3 and the fourth transparent electrode 112-4 (see FIGS. 5A to 5C etc.). In addition, the first substrate 111-1 and the second substrate 111-2 are far enough from each other that the liquid crystal molecules on the side of the first substrate 111-1 are hardly affected by the first potential applied to the third transparent electrode 112-3 or the second potential applied to the fourth transparent electrode 112-4. Similarly, the liquid crystal molecules on the side of the second substrate 111-2 are hardly affected by the first potential applied to the first transparent electrode 112-1 or the second potential applied to the second transparent electrode 112-2.

In the second liquid crystal cell 120, the first potential is applied to each of the first transparent electrode 122-1 and the third transparent electrode 122-3. Further, the second potential is applied to each of the second transparent electrode 122-2 and the fourth transparent electrode 122-4. The phases of the first potential applied to the first transparent electrode 122-1 and the third transparent electrode 122-3 and the second potential applied to the second transparent electrode 122-2 and the fourth transparent electrode 122-4 are inverted. Therefore, potential differences (for example, +30 V or −30 V) are generated between the first transparent electrode 122-1 and the second transparent electrode 122-2 and between the third transparent electrode 122-3 and the fourth transparent electrode 122-4. Further, potential differences (for example, +30 V or −30 V) are generated between the first transparent electrode 122-1 and the fourth transparent electrode 122-4 and between the second transparent electrode 122-2 and the third transparent electrode 122-3.

As a result, the alignment states of the liquid crystal molecules on the side of the first substrate 121-1 change according to the potential difference between the first transparent electrode 122-1 and the second transparent electrode 122-2 (see FIGS. 5A to 5C etc.). Further, the alignment states of the liquid crystal molecules on the side of the second substrate 121-2 change according to the potential difference between the third transparent electrode 122-3 and the fourth transparent electrode 122-4 (see FIGS. 5A to 5C etc.). In addition, the first substrate 121-1 and the second substrate 121-2 are far enough from each other that the liquid crystal molecules on the side of the first substrate 121-1 are hardly affected by the first potential applied to the third transparent electrode 122-3 or the second potential applied to the fourth transparent electrode 122-4. Similarly, the liquid crystal molecules on the side of the second substrate 121-2 are hardly affected by the first potential applied to the first transparent electrode 122-1 or the second potential applied to the second transparent electrode 122-2.

Further, as shown in FIG. 10, both of the periodical potential change between the first transparent electrode 112-1 and the third transparent electrode 112-3 of the first liquid crystal cell 110 and between the first transparent electrode 122-1 and the third transparent electrode 122-3 of the second liquid crystal cell 120 are synchronized with each other. Furthermore, the time changes in the potentials of the second transparent electrode 112-2 and the fourth transparent electrode 112-4 of the first liquid crystal cell 110 and the time changes in the potentials of the second transparent electrode 122-2 and the fourth transparent electrode 122-4 of the second liquid crystal cell 120, respectively, are synchronized with each other.

When the potentials as described above are applied to respective transparent electrodes, the liquid crystal molecules of the liquid crystal layer 113 on the side of the first substrate 111-1 of the first liquid crystal cell 110 refract the light having the polarization in the x-axis direction in the x-axis direction. Further, the liquid crystal molecules of the liquid crystal layer 113 on the side of the second substrate 111-2 of the first liquid crystal cell 110 refract the light having the polarization in the y-axis direction in the y-axis direction. Therefore, the first liquid crystal cell 110 diffuse the light having the polarization in the x-axis direction in the x-axis and the y-axis.

Further, the liquid crystal molecules of the liquid crystal layer 123 on the side of the first substrate 121-1 of the second liquid crystal cell 120 refract the light having the polarization in the x-axis direction in the x-axis direction. Furthermore, the liquid crystal molecules of the liquid crystal layer 123 on the side of the second substrate 121-2 of the second liquid crystal cell 120 refract the light having the polarization in the y-axis direction in the y-axis direction. Therefore, the second liquid crystal cell 120 also diffuse the light having the polarization in the x-axis direction in the x-axis and the y-axis.

That is, in the case that potentials of respective transparent electrodes correspond to the potentials shown in FIG. 10, when light is incident from the side of the first substrate 111-1 of the first liquid crystal cell 110, the optical element 10 diffuses the first polarization component 310 having the polarization axis in the x-axis direction in the x-axis direction on the side of the first substrate 111-1 while the polarization axis changes from the x-axis direction to the y-axis direction in the process of passing through the first liquid crystal cell 110. Further, the first polarization component 310, of which the polarization axis changes from the x-axis direction to the y-axis direction, is diffused in the y-axis direction on the side of the second substrate 111-2. On the other hand, the second polarization component 320 having the polarization in the y-axis is not diffused while the polarization axis changes from the y-axis direction to the x-axis direction. Then, these polarization components enter the second liquid crystal cell 120. The optical element 10 diffuses the second polarization component 320, of which the polarization axis changes from the y-axis direction to the x-axis direction without diffusing in the first liquid crystal cell 110, in the x-axis direction on the side of the first substrate 121-1 while the polarization axis changes from the x-axis direction to the y-axis direction in the process of passing through the second liquid crystal cell 120. Further, the second polarization component 320, of which the polarization axis from the x-axis direction to the y-axis direction, is diffused in the y-axis direction on the side of the second substrate 121-2. On the other hand, the first polarization component 310, of which the polarization axis changes from the x-axis direction to the y-axis direction while continuing to diffuse in the first liquid crystal cell 110, is not diffused while the polarization axis changes from the y-axis direction to the x-axis direction. As a result, the first polarization component 310 of the light incident on the optical element 10 is diffused in the x-direction and the y-direction in the process of passing through the first liquid crystal cell 110 and the second polarization component 310 of the light incident on the optical element 10 is diffused in the x-axis direction and the y-direction in the process of passing through the second crystal cell 120. Therefore, the light transmitted through the optical element 10 can form a light distribution pattern spreading in a rectangular shape.

Although some light distribution patterns are exemplified in the above description, the light distribution angle indicating the distribution of light can be controlled by the magnitude of the potential applied to the transparent electrode. For example, when the potential applied to the transparent electrode is increased, the light distribution angle increases and a light distribution pattern in which light is more diffused is obtained. The light distribution angle can also be controlled by, for example, the inter-substrate distance d or the pitch p.

[5. Correlation between Inter-Substrate Distance and Pitch]

The correlation between the inter-substrate distance d and the pitch p is described in detail with reference to FIG. 11.

Figure 11:
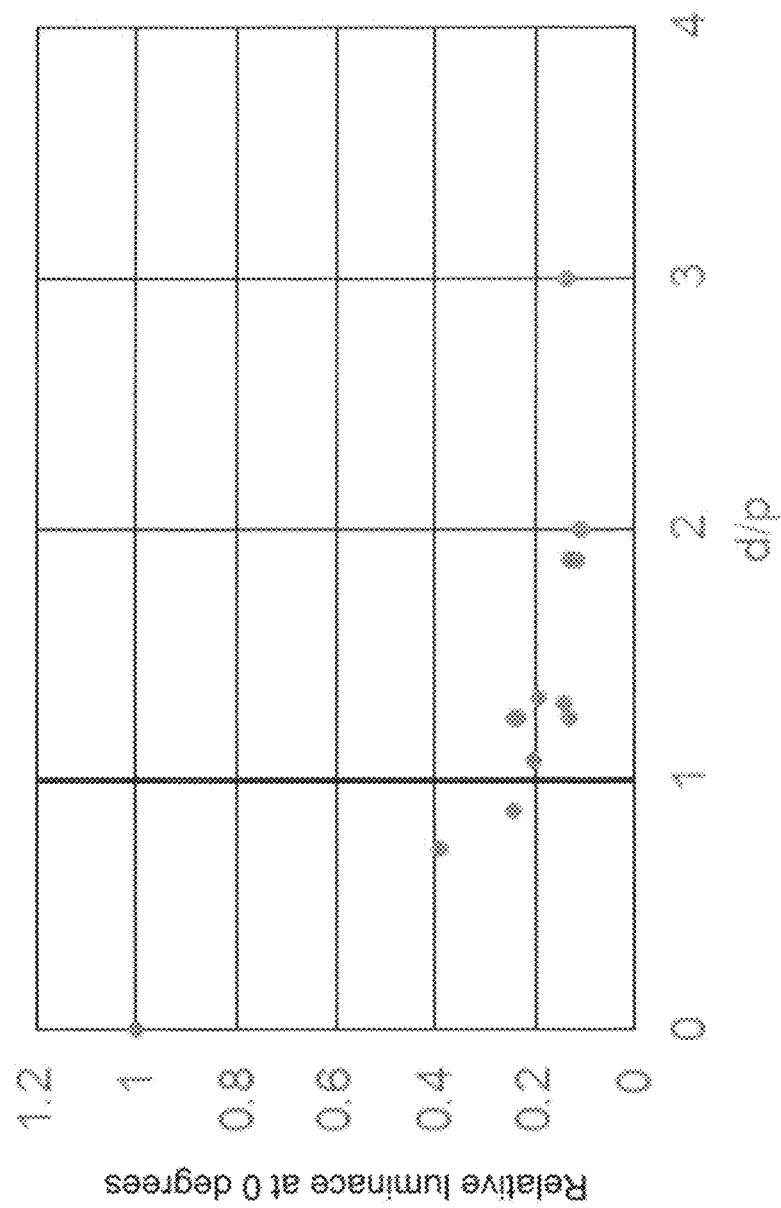
FIG. 11 is a graph showing front relative luminance versus d/p in a liquid crystal cell of an optical element according to an embodiment of the present invention.

FIG. 11 is a graph showing front relative luminance (relative luminance at 0 degrees) versus d/p in the liquid crystal cell of the optical element 10 according to an embodiment of the present invention. The inter-substrate distance d is the distance between the first substrate 111-1 and the second substrate 111-2 of the first liquid crystal cell 110 (or the distance between the first substrate 121-1 and the second substrate 121-2 of the second liquid crystal cell 120), as shown in FIGS. 4A to 5B. Further, the pitch p is the first pitch $p_1$ shown in FIG. 3A (or the second pitch $p_2$ shown in FIG. 3B). Furthermore, the front relative luminance is the luminance of light emitted from the vertical direction (0 degrees) of the second substrate 111-2 of light which is incident on the first substrate 111-1 and emitted from the second substrate 111-2. In the graph shown in FIG. 11, the front relative luminance is normalized with the luminance of the light without the optical element (in the case of only the light source) as 1. Therefore, the y-axis of the graph shown in FIG. 11 can also be referred as the relative luminance ratio when the luminance without the optical element 10 is set to 1.

In addition, the liquid crystal cell from which data of the graph shown in FIG. 11 are obtained has the first transparent electrode 112-1 and the second transparent electrode 112-2 formed on the first substrate 111-1 but the third transparent electrode 112-3 and the fourth transparent electrode 112-4 not formed on the second substrate 111-2. Further, when the luminance is measured, a low potential (0 V) was applied to the first transparent electrode 112-1 and a high potential (30 V) was applied to the second transparent electrode 112-2.

As shown in FIG. 11, although the front relative luminance decreases as d/p increases, the rate of the decrease in the front relative luminance differs greatly between d/p<1 and d/p≥1. In d/p<1, although the front relative luminance decreases significantly as d/p=1 is approached, the front relative luminance is measured at about 0.2 to 0.4. This indicates that although the luminance is decreased due to the diffusion of light by the liquid crystal cell, the diffusion is still insufficient. On the other hand, in d/p≥1, the front relative luminance is less than or equal to 0.1, and then the front relative luminance is stable even when d/p is increased. This indicates that the diffusion of light by the liquid crystal cell is sufficient in d/p≥1. That is, excellent light diffusion is provided in d/p≥1. Therefore, in the optical element 10, the inter-substrate distanced and the pitch p preferably satisfy d/p≥1, more preferably d/p≥2.

Further, since the transparent electrode material has a high refractive index, the transparent electrode may affect the transmittance of the liquid crystal cell. Therefore, it is preferable that the width of the transparent electrode is small. That is, it is preferable that the inter-electrode distance b (the first inter-electrode distance $b_1$ or the second inter-electrode distance $b_2$ shown in FIG. 3A or 3B) is less than or equal to the width a of the transparent electrode (the first width $a_1$ or the second width $a_2$ shown in FIG. 3A or 3B). For example, when the inter-electrode distance b is expressed in relation to the pitch p, it is preferable to satisfy p/2≤b.

As described above, the optical element 10 according to the present embodiment has two liquid crystal cells and can easily control the light distribution or the light distribution patterns of the light transmitted through the optical element by controlling the potentials applied to respective transparent electrodes.

Second Embodiment

A configuration of a lighting device 20 according to an embodiment of the present invention is described with reference to FIG. 12.

Figure 12:
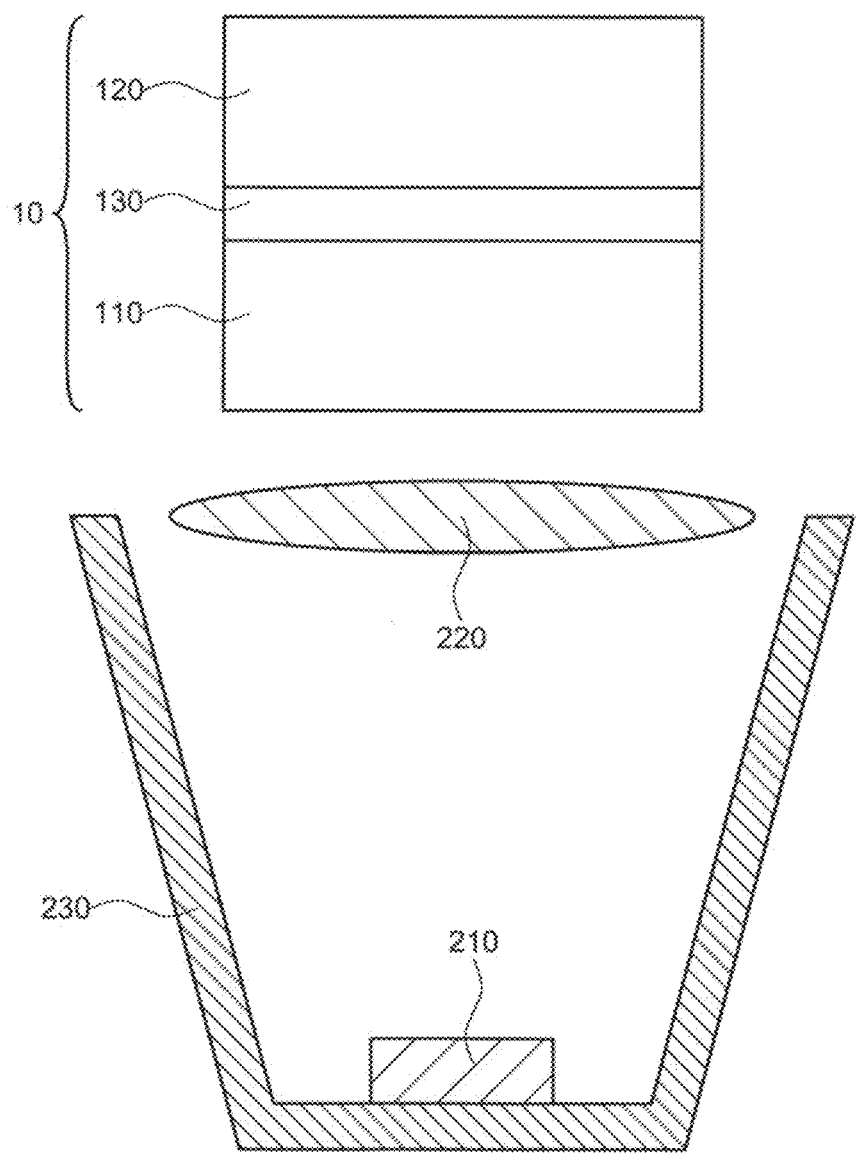
FIG. 12 is a schematic diagram showing the configuration of a lighting device according to an embodiment of the present invention.

FIG. 12 is a schematic diagram showing the configuration of a lighting device 20 according to an embodiment of the present invention. As shown in FIG. 12, the lighting device 20 includes the optical element 10, a light source 210, a convex lens 220, and a reflector 230. The convex lens 220 is located between the optical element 10 and the light source 210. The reflector 230 is located to surround the space between the light source 210 and the convex lens 220.

The light source 210 can emit light. For example, an electric bulb, a fluorescent lamp, a cold cathode tube, a light emitting diode (LED), or a laser diode (LD) can be used for the light source 210. Preferably, the light source 210 of the lighting device 20 is the LED. The lighting device 20 using the LED with high luminous efficiency as the light source 210 has high luminance and low power consumption. In addition, the LED and the LD include an organic light emitting diode (OLED) and an organic laser diode (OLD), respectively.

The convex lens 220 can collect the light emitted from the light source 210 and make the collected light enter the optical element 10.

The reflector 230 can reflect the light emitted from the light source 210 and allow the reflected light to enter the convex lens 220. For example, although the shape of the reflector 230 is substantially conical, the shape of the reflector 230 is not limited to this shape. Further, the surface of the reflector 230 may be flat or curved.

Furthermore, the lighting device 20 may include a control unit that controls the potentials applied to the transparent electrodes so that various light distribution patterns can be formed.

As described above, since the lighting device 20 according to the present embodiment includes the optical element 10, the light distribution or the light distribution patterns of the light emitted from the lighting device 20 can be easily controlled.

Within the scope of the present invention, those skilled in the art may conceive of examples of changes and modifications, and it is understood that these examples of changes and modifications are also included within the scope of the present invention. For example, additions, deletions, or design changes of constituent elements, or additions, omissions, or changes to conditions of steps as appropriate based on the respective embodiments described above are also included within the scope of the present invention as long as the gist of the present invention is provided.

Further, other effects which differ from those brought about by the embodiment, but which are apparent from the description herein or which can be readily predicted by those skilled in the art, are naturally understood to be brought about by the present invention.

What is claimed is:

1. An optical element comprising:
a first liquid crystal cell into which light, including a first polarized component having a first polarized axis in a first direction and a second polarized component having a second polarized axis in a second direction intersecting the first direction, is configured to enter; and
a second liquid crystal cell from which the light is configured to be emitted after passing through the first liquid crystal cell,
wherein
the first liquid crystal cell and the second liquid crystal cell are stacked,
each of the first liquid crystal cell and the second liquid crystal cell comprises:
a first substrate,
a first transparent electrode and a second transparent electrode alternately and repeatedly arranged in the first direction on the first substrate and extending in the second direction,
a first alignment film covering the first and second transparent electrodes, the first alignment film having an alignment direction in the first direction,
a second substrate,
a third transparent electrode and a fourth transparent electrode alternately and repeatedly arranged in the second direction on the second substrate and extending in the first direction,
a second alignment film covering the third and fourth transparent electrodes, the second alignment film having an alignment direction in the second direction, and
a liquid crystal layer between the first substrate and the second substrate, a long axis of liquid crystal molecules in the liquid crystal layer aligned according to both of the alignment directions of the first and second alignment films so as to rotate horizontally from the first direction to the second direction from the first substrate side to the second substrate side,
the second substrate of the first liquid crystal cell and the first substrate of the second liquid crystal cell are adjacent to each other,
wherein
in an OFF state in which no electric field is applied to the first to fourth transparent electrodes,
the first polarized component and the second polarized component are optically rotated as passing through each of the liquid crystal layer from the first substrate to the second substrate so as to rotate the first polarized axis from the first direction to the second direction and the second polarized axis from the second direction to the first direction, and
in an ON state in which an electric field is provided between the first and second transparent electrodes of the first liquid crystal cell and the second liquid crystal cell,
in the first liquid crystal cell, the first polarized component and the second polarized component are optically rotated as passing through the liquid crystal layer from the first substrate to the second substrate so as to rotate the first polarized axis from the first direction to the second direction and the second polarized axis from the second direction to the first direction with the first polarized component diffusing in the first direction at the first substrate side, and
in the second liquid crystal cell, the first polarized component and the second polarized component are optically rotated as passing through the liquid crystal layer from the first substrate to the second substrate so as to rotate the first polarized axis from the first direction to the second direction and the second polarized axis from the second direction to the first direction with the second polarized component diffusing in the first direction at the first substrate side.

2. The optical element according to claim 1, wherein the second direction is orthogonal to the first direction.

3. The optical element according to claim 1, wherein an inter-substrate distance d between the first substrate and the second substrate and a first pitch $p_1$ between the first transparent electrode and the second transparent electrode satisfy $d/p_1 \geq 1$.

4. The optical element according to claim 3, wherein the inter-substrate distance d and the first pitch $p_1$ satisfy $d/p_1 \geq 2$.

5. The optical element according to claim 3, wherein the first pitch $p_1$ and a first inter-electrode distance $b_1$ between the first transparent electrode and the second transparent electrode satisfy $p_1/2 \leq b_1$.

6. The optical element according to claim 3, wherein the inter-substrate distance d and a second pitch $p_2$ between the third transparent electrode and the fourth transparent electrode satisfy $d/p_2 \geq 1$.

7. The optical element according to claim 6, wherein the inter-substrate distance d and the second pitch $p_2$ satisfy $d/p_2 \geq 2$.

8. The optical element according to claim 6, wherein the second pitch $p_2$ and a second inter-electrode distance $b_2$ between the third transparent electrode and the fourth transparent electrode satisfy $p_2/2 \leq b_2$.

9. The optical element according to claim 1, wherein the second substrate of the first liquid crystal cell and the first substrate of the second liquid crystal cell are adjacent to each other via an optical elastic resin layer.

10. The optical element according to claim 1, wherein different potentials are applied to the first transparent electrode, the second transparent electrode, the third transparent electrode, and the fourth transparent electrode, respectively.

11. The optical element according to claim 1, wherein in a plan view,
the first transparent electrode of the first liquid crystal cell and the first transparent electrode of the second liquid crystal cell overlap each other in an extending direction,
the second transparent electrode of the first liquid crystal cell and the second transparent electrode of the second liquid crystal cell overlap each other in an extending direction,
the third transparent electrode of the first liquid crystal cell and the third transparent electrode of the second liquid crystal cell overlap each other in an extending direction, and
the fourth transparent electrode of the first liquid crystal cell and the fourth transparent electrode of the second liquid crystal cell overlap each other in an extending direction.

12. The optical element according to claim 1, wherein in a plan view,
the first transparent electrode of the first liquid crystal cell and the first transparent electrode of the second liquid crystal cell overlap so as to substantially match each other in an extending direction,
the second transparent electrode of the first liquid crystal cell and the second transparent electrode of the second liquid crystal cell overlap so as to substantially match each other in an extending direction,
the third transparent electrode of the first liquid crystal cell and the third transparent electrode of the second liquid crystal cell overlap so as to substantially match each other in an extending direction, and
the fourth transparent electrode of the first liquid crystal cell and the fourth transparent electrode of the second liquid crystal cell overlap so as to substantially match each other in an extending direction.

13. A lighting device comprising:
a light source which emits light including a first polarized component having a first polarized axis in a first direction and a second polarized component having a second polarized axis in a second direction intersecting the first direction; and
an optical element comprising a first liquid crystal cell and a second liquid crystal cell,
wherein
the first liquid crystal cell and the second liquid crystal cell are stacked,
each of the first liquid crystal cell and the second liquid crystal cell comprises:
a first substrate,
a first transparent electrode and a second transparent electrode alternately and repeatedly arranged in the first direction on the first substrate and extending in the second direction,
a first alignment film covering the first and second transparent electrodes, the first alignment film having an alignment direction in the first direction,
a second substrate,
a third transparent electrode and a fourth transparent electrode alternately and repeatedly arranged in the second direction on the second substrate and extending in the first direction,
a second alignment film covering the third and fourth transparent electrodes, the second alignment film having an alignment direction in the second direction, and
a liquid crystal layer between the first substrate and the second substrate, a long axis of liquid crystal molecules in the liquid crystal layer aligned according to both of the alignment directions of the first and second alignment films so as to rotate horizontally from the second direction to the first direction from the first substrate side to the second substrate side,
the second substrate of the first liquid crystal cell and the first substrate of the second liquid crystal cell are adjacent to each other,
wherein
in an OFF state in which no electric field is applied to the first to fourth transparent electrodes,
the first polarized component and the second polarized component are optically rotated as passing through each of the liquid crystal layer from the first substrate to the second substrate so as to rotate the first polarized axis from the first direction to the second direction and the second polarized axis from the second direction to the first direction,
in an ON state in which an electric field is provided between the first and second transparent electrodes of the first liquid crystal cell and an electric field is provided between the first and second transparent electrodes of the second liquid crystal cell,
in the first liquid crystal cell, the first polarized component and the second polarized component are optically rotated as passing through the liquid crystal layer from the first substrate to the second substrate so as to rotate the first polarized axis from the first direction to the second direction and the second polarized axis from the second direction to the first direction with the first polarized component diffusing in the first direction at the first substrate side, and
in the second liquid crystal cell, the first polarized component and the second polarized component are optically rotated as passing through the liquid crystal layer from the first substrate to the second substrate so as to rotate the first polarized axis from the first direction to the second direction and the second polarized axis from the second direction to the first direction with the second polarized component diffusing in the first direction at the first substrate side.

14. The lighting device according to claim 13, further comprising a convex lens between the light source and the optical element.

15. The lighting device according to claim 13, further comprising a reflector configured to reflect light emitted from the light source so as to be incident on the optical element.

* * * * *